United States Patent
Spargo et al.

(10) Patent No.: US 11,777,385 B2
(45) Date of Patent: Oct. 3, 2023

(54) EXCITATION SYSTEM

(71) Applicant: Cummins Generator Technologies Limited, Peterborough (GB)

(72) Inventors: Anthony Spargo, Peterborough (GB); Peethamparam Anpalahan, Peterborough (GB)

(73) Assignee: Cummins Generator Technologies Limited, Peterborough (GB)

(*) Notice: Subject to any disclaimer, the term of this patent is extended or adjusted under 35 U.S.C. 154(b) by 372 days.

(21) Appl. No.: 16/764,686

(22) PCT Filed: Nov. 16, 2018

(86) PCT No.: PCT/GB2018/053320
§ 371 (c)(1),
(2) Date: May 15, 2020

(87) PCT Pub. No.: WO2019/097243
PCT Pub. Date: May 23, 2019

(65) Prior Publication Data
US 2020/0412215 A1 Dec. 31, 2020

(30) Foreign Application Priority Data

Nov. 17, 2017 (GB) .................................... 1719053

(51) Int. Cl.
*H02K 19/28* (2006.01)
*H02K 1/24* (2006.01)
(Continued)

(52) U.S. Cl.
CPC ............... *H02K 19/28* (2013.01); *H02K 1/24* (2013.01); *H02K 9/06* (2013.01); *H02K 19/12* (2013.01); *H02K 15/165* (2013.01)

(58) Field of Classification Search
CPC .......... H02K 19/28; H02K 19/38; H02K 1/24; H02K 19/12; H02K 9/06; H02K 7/04; H02K 1/30; H02K 7/20
(Continued)

(56) References Cited

U.S. PATENT DOCUMENTS 4,887,020 A   12/1989   Graham
5,168,190 A   12/1992   Bahn
(Continued)

FOREIGN PATENT DOCUMENTS

CN   1050954 A   4/1991
CN   2315710 Y   4/1999
(Continued)

OTHER PUBLICATIONS

International Search Report and Written Opinion issued in Corresponding International Application No. PCT/GB2018/053320 dated May 23, 2019, twenty-two (22) pages.
(Continued)

*Primary Examiner* — Leda T Pham
(74) *Attorney, Agent, or Firm* — Foley & Lardner LLP

(57) ABSTRACT

An excitation system (15) is disclosed for providing excitation to a main rotating electrical machine (2). The excitation system comprises an exciter (50) and an auxiliary generator (52). The exciter and the auxiliary generator have separate stator cores (14, 18) and share a common rotor core (16). The common rotor (16) core may be located between the two stator cores (14, 18). This may help to optimize space, improve material usage and reduce the total rotating mass. A mounting arrangement for the common rotor core is also disclosed.

20 Claims, 21 Drawing Sheets

(51) Int. Cl.
  *H02K 9/06* (2006.01)
  *H02K 19/12* (2006.01)
  *H02K 15/16* (2006.01)

(58) Field of Classification Search
  USPC .................................................. 310/112–114
  See application file for complete search history.

(56) References Cited

U.S. PATENT DOCUMENTS

| | | | |
|---|---|---|---|
| 5,587,616 A | | 12/1996 | Johnsen |
| 5,744,895 A | * | 4/1998 | Seguchi ................. B60K 6/365 |
| | | | 903/952 |
| 7,086,137 B2 | | 8/2006 | Tornquist et al. |
| 10,050,503 B2 | | 8/2018 | Yamada |
| 2003/0048020 A1 | | 3/2003 | Tornquist et al. |
| 2007/0108865 A1 | * | 5/2007 | Jansen ................... H02K 21/12 |
| | | | 440/6 |
| 2011/0241465 A1 | * | 10/2011 | Anghel ................. H02K 7/006 |
| | | | 310/114 |

FOREIGN PATENT DOCUMENTS

| | | | | |
|---|---|---|---|---|
| CN | 101409484 A | | 4/2009 | |
| CN | 201699548 | * | 1/2011 | ............ H02K 15/02 |
| CN | 201699548 U | | 1/2011 | |
| CN | 206164318 U | | 5/2017 | |
| DE | 19617300 A1 | | 11/1997 | |
| GB | 2 496 674 A | | 5/2013 | |
| GB | 2496674 A | * | 5/2013 | ............ H02K 16/00 |
| GB | 2 547 622 A | | 8/2017 | |
| GB | 2547622 A | * | 8/2017 | ............ H02K 19/38 |
| JP | S51-133712 A | | 11/1976 | |
| JP | 2010-081753 A | | 4/2010 | |

OTHER PUBLICATIONS

Search Report Issued in Corresponding UK Patent Application No. GB1719053.9 dated May 11, 2018, four (4) pages.
Office Action issued in Chinese Patent Application No. 201880073137.6 dated Aug. 2, 2022, English translation, 11 pages.
Office Action issued in European Patent Application No. 18808078.2 dated Dec. 23, 2021, 6 pages.
Office Action issued in Indian Patent Application No. 202047024770 dated Sep. 22, 2022, with English translation, 7 pages.

* cited by examiner

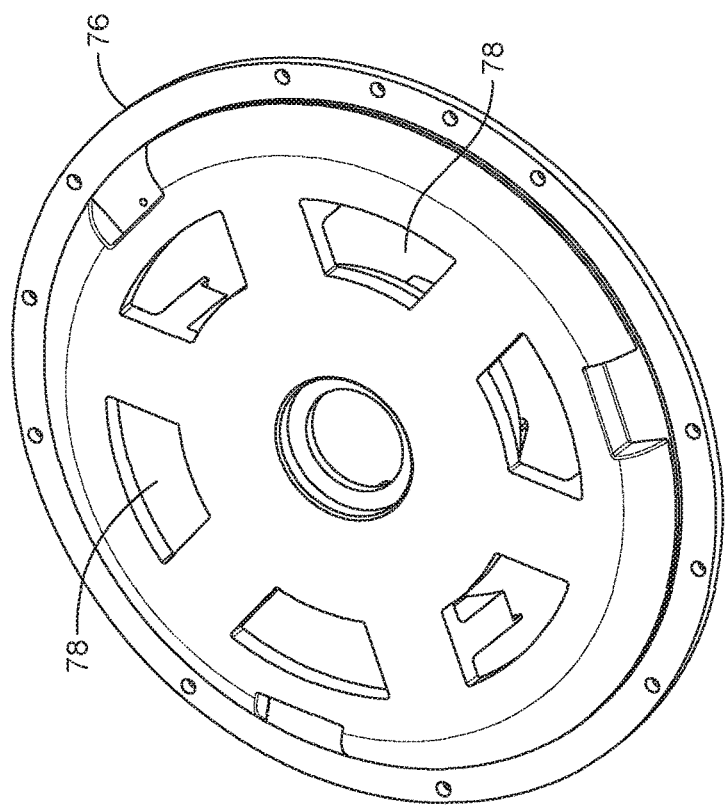
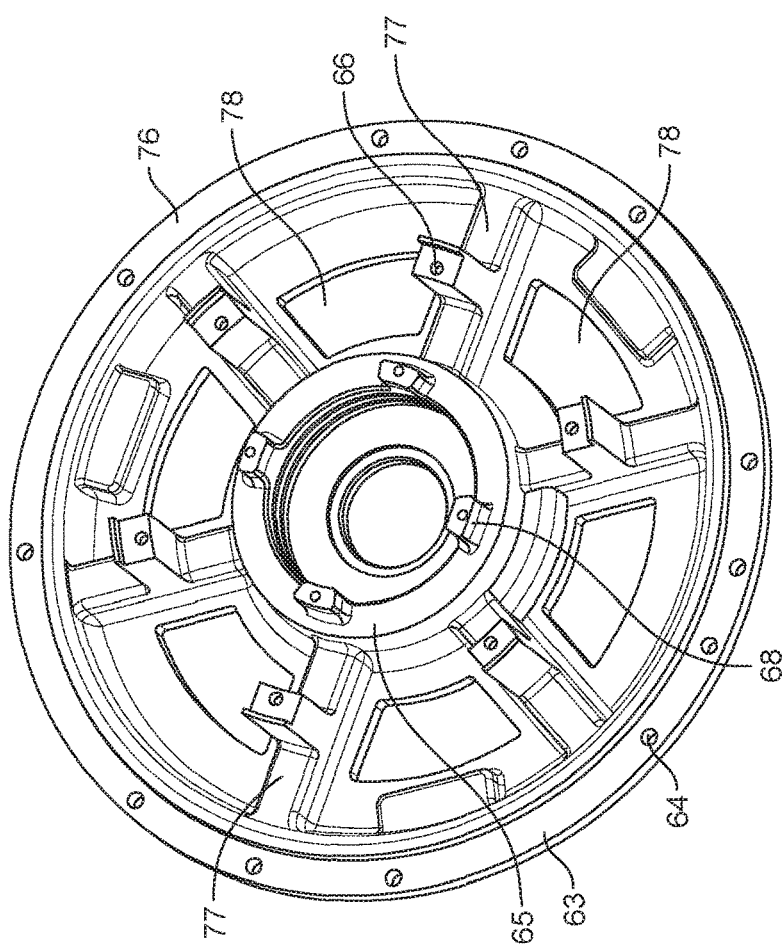
FIG. 10B
FIG. 10A

EXCITATION SYSTEM

CROSS-REFERENCE TO RELATED APPLICATIONS

The present application is a U.S. National Phase filing of PCT International Application No. PCT/GB2018/053320, filed on Nov. 16, 2018, which claims the benefit of and priority to United Kingdom Patent Application No. 1719053.9, filed Nov. 17, 2017. The entire contents of these applications are incorporated by reference herein.

The present invention relates to an excitation system for providing excitation to a rotating electrical machine, such as a synchronous generator.

Synchronous generators operate by rotating a magnetic field produced by a rotor relative to windings in a stator in order to generate an AC output in the stator windings. The rotor's magnetic field is produced by passing a DC current through windings in the rotor. This DC current may be generated by an exciter mounted on the shaft of the generator. An automatic voltage regulator (AVR) may be provided to control the exciter, and thereby to control the current supplied to the rotor windings.

The power for the exciter may be derived from the output of the main machine (known as self-excitation). However, certain applications may require the generator to have short circuit maintenance and/or enhanced overload capability. In order to achieve this, it is known to use a separate permanent magnet generator (PMG) mounted on the generator shaft to provide the power for the exciter. The use of a PMG means that power can be supplied to the exciter independently of the output of the main machine.

The main machine, exciter and PMG are generally provided in series along a rotary shaft. The PMG and the exciter take up axial space on the shaft, and it is generally desirable to minimise the space that is occupied so that the size of the overall apparatus is minimised. This is particularly the case where the PMG is being retro-fitted to the generator, in which case the space constraints may already be defined.

GB 2496674 A in the name of the present applicant, the subject matter of which is incorporated herein by reference, discloses an excitation system in which a PMG is nested inside an exciter. This arrangement can allow the overall size of the apparatus to be reduced, in comparison to the case where the PMG and exciter are provided in series. However, the disclosed arrangement requires a large number of parts, and may be complex to manufacture.

GB 2547622 A in the name of the present applicant, the subject matter of which is incorporated herein by reference, discloses an excitation system in which the stator of the exciter and the stator of the PMG are co-located in the centre of the excitation system. This can facilitate assembly and help to provide a compact arrangement and a reduced number of parts. However, it has been found that the disclosed system is still rather complex to produce, and requires a relatively complex mounting system due to the number of rotating parts. Furthermore, the disclosed system has a relatively large rotating mass, and may require the excitation system to be located externally to the main machine housing.

It would therefore be desirable to provide a system with reduced complexity, reduced rotor mass, improved material usage, a simple mounting solution, and/or without external rotating parts. It may also be desirable to provide an excitation system in which the exciter can be provided either with or without a PMG, depending on customer requirements.

According to a first aspect of the present invention there is provided an excitation system for providing excitation to a main rotating electrical machine, the excitation system comprising an exciter and an auxiliary generator, wherein the exciter and the auxiliary generator have separate stator cores and share a common rotor core.

The present invention may provide the advantage that, by using a common rotor core for the exciter and the auxiliary generator, it may be possible to provide a system with reduced complexity, improved material usage, and/or with a simple mounting solution. It may also be possible to reduce the mass of the rotating components, which may allow smaller bearings to be used and/or the life of the bearings to be extended. Furthermore, it may be possible to provide a system without external rotating parts. In addition, it may be possible to provide an excitation system in which the exciter can be provided either with or without a PMG, depending on customer requirements.

Preferably, the auxiliary generator generates power to excite the exciter, and the exciter generates power to excite the main machine. The main machine is preferably a rotating electrical machine, such as a synchronous generator. The rotating electrical machine may have field windings which are to be excited by the excitation system. An output of the exciter may be connected to the field windings of the main machine via a rotating rectifier. An output of the auxiliary generator may be connected to an input of the exciter via an automatic voltage regulator (AVR).

Preferably, exciter rotor windings and auxiliary generator poles are both provided on the common rotor core. By sharing a common rotor core in this way, the cost and complexity of the system may be reduced.

Preferably one of the auxiliary generator and the exciter is nested inside the other. Thus, the auxiliary generator and the exciter may be of the same or similar length axially, and one may be located inside the other with little or no axial displacement. This may help to minimise the overall size of the system.

For example, the auxiliary generator may be nested inside the exciter. This arrangement may allow the exciter to be larger than the auxiliary generator, and thus to have a higher power. Since the exciter is typically used to excite a higher power main machine, this may help to ensure that the exciter and the auxiliary generator are appropriately sized.

In one embodiment, exciter rotor windings may be provided on a radially outwards side of the common rotor core, and auxiliary generator poles may be provided on a radially inwards side of the common rotor core. In this case, the common rotor core may comprise slots on its radially outwards side for exciter rotor windings. In another embodiment, auxiliary generator poles may be provided on a radially outwards side of the common rotor core, and exciter rotor windings may be provided on a radially inwards side of the common rotor core.

Preferably the exciter comprises an exciter stator core and the auxiliary generator comprises an auxiliary generator stator core. In this case the exciter stator core may be located radially outwards of the common rotor core and the auxiliary generator stator core may be located radially inwards of the common rotor core. This may help to provide a compact arrangement with a minimum number of parts.

However, it would also be possible to arrange the exciter and the auxiliary generator the other way around. Thus, in an alternative arrangement, the auxiliary generator stator core may be located radially outwards of the common rotor core, and the exciter stator core may be located radially inwards of the common rotor core. An advantage of this arrangement is that, where the auxiliary generator is a PMG, the quantity of permanent magnet material and windings in the PMG can be reduced, due to the larger diameter of the PMG. Thus, this arrangement may be advantageous in situations where a smaller exciter will be suitable for the application.

Preferably at least one of the exciter stator core, the common rotor core and the auxiliary generator stator core is laminated. For example, the exciter stator core, the common rotor core and/or the auxiliary generator stator core may be formed from laminations of raw material such as steel.

In a preferred embodiment, laminations for the exciter stator core, the common rotor core and the auxiliary generator stator core are concentric. This can allow a lamination for each of the exciter stator core, the common rotor core and the auxiliary generator stator core to be punched from a concentric part of the same sheet of raw material. Thus, a lamination for the auxiliary generator stator core may be stamped from an area of raw material which is inside an area from which the common rotor core is stamped. Similarly, a lamination for the common rotor core may be stamped from an area of raw material which is inside an area from which the exciter stator core is stamped. This can allow more efficient usage of raw material than a conventional design, in which the cores are typically punched from two or three different parts of raw material.

Preferably the exciter stator core and the auxiliary generator stator core are attached to a non-rotating part of the main electrical machine. This may conveniently be achieved by mounting the exciter stator core and/or the auxiliary generator stator core on a bracket. The bracket may be, for example, a substantially disc-shaped, non-drive end bracket. The bracket may function to close the end of the machine and/or may be used for supporting a shaft of the main machine. Thus, the bracket may serve the functions of supporting the shaft and/or closing the machine, and supporting at least one of the exciter stator core and the auxiliary generator stator core, thereby reducing the total number of components required.

The bracket may comprise a first set of mounts for mounting the exciter stator, and a second set of mounts for mounting the auxiliary generator stator. One set of mounts may be located radially inwards of the other set of mounts. For example, the second set of mounts may be located radially inwards of the first set of mounts.

The mounts may be in the form of protrusions which extend axially out of the bracket. For example, where the bracket is disc-shaped, the mounts may extend out of the plane of the bracket. At least one of the first set of mounts and the second set of mounts may be arranged in a substantially circular configuration about a face of the bracket. This may facilitate mounting of the exciter stator core and the auxiliary generator stator core on the bracket. However, in an alternative arrangement, a continuous annular mounting surface could be provided for either or both of the exciter stator core and the auxiliary generator stator core.

The bracket may comprise ventilation holes for allowing airflow through the machine. Conveniently, the ventilation holes may be provided between adjacent mounts for mounting the exciter stator. Thus, a plurality of ventilation holes may be provided spaced circumferentially about the bracket.

The bracket may also comprise a mating face for mating with a frame of the electrical machine, and/or a bearing support member for supporting a bearing for the shaft of the main machine. The bracket may further comprise radial ribs extending between the mating face and the bearing support member. The radial ribs may help to provide stiffness and strength to the bracket.

The mounts for mounting the exciter stator may be co-located with the radial ribs. In this case, where ventilation holes are provided in the bracket, the ventilation holes may be provided between adjacent ribs. This may help to ensure that the bracket has sufficient structural strength due to the ribs, despite the presence of the ventilation holes.

In the above arrangement the first set of mounts and the second set of mounts are preferably provided on the same side of the bracket. For example, the first set of mounts and the second set of mounts may be provided on the inward facing side of the bracket (that is, the side which faces the main machine). This can allow the excitation system to be located inside the bracket, and thus also inside the frame of the main machine. This may help to provide ingress protection and reduce the likelihood of external bodies coming into contact with rotating parts. Furthermore, this arrangement may help to reduce the number of components required, and reduce the overall length of the electrical machine.

This aspect of the invention may be provided independently. Thus, according to another aspect of the invention, there is provided a bracket for a rotating electrical machine, the bracket comprising a first set of mounts for mounting an exciter stator, and a second set of mounts for mounting an auxiliary generator stator, wherein the first set of mounts and the second set of mounts are provided on an inward facing side of the bracket. The bracket may be for supporting a shaft of the rotating electrical machine and/or for closing an end of the machine. Any of the features described above may also be provided with this aspect of the invention.

The common rotor core is preferably driven by a shaft, which may be the shaft of the main machine. Preferably a rotor mount is provided for connecting the common rotor core to a shaft of the machine. This can allow rotation of the shaft to be transferred to rotation of the common rotor core. The rotor mount may be in the form of a rotor hub which is arranged to attach directly to the shaft, or provided as a separate component which attaches to a rotor hub.

The rotor mount may comprise means for mounting the common rotor core. For example, a plurality of mounts could be provided, which may be in the form of protrusions which extend axially out of the rotor mount. Alternatively, a continuous annular mounting surface could be provided. In either case, bolt holes may be provided for securing the common rotor core to the rotor mount.

The rotor mount may comprise means for connecting the rotor mount to the shaft of the machine. For example, a substantially cylindrical surface may be provided for connection to the shaft or a rotor hub.

In one embodiment, the rotor mount may comprise a first mounting member for connecting to the common rotor core, and a second mounting member for connecting to the shaft of the machine. The first mounting member and the second mounting member may be connected to each other directly, or via one or more intermediate components. The second mounting member may either connect directly to the shaft, or via another component such as a hub.

At least one of the rotor mount and the common rotor core may comprise a protrusion (for example, an axial protrusion) which engages with a recess in the other of the rotor mount and the common rotor core. This can help with location of the common rotor core on the rotor mount, and can help to prevent rotation and/or loss of concentricity when the machine is in operation.

The rotor mount may comprise at least one axial channel for accommodating an electrical connection (such as one or more wires) between the exciter and the main machine. This can allow the output of the exciter to be connected, via rotating diodes, to the rotor of the main machine.

The rotor mount may comprise means (such as slots) for mounting rotating diodes. This may provide a convenient location for attaching rotating diodes which connect the exciter rotor to the rotor of the main machine. Alternatively, rotating diodes may be mounted on the non-drive end side of the excitation system.

The excitation system may further comprise a fan, which may comprise a plurality of fan blades. In operation, the fan may help to draw air in an axial direction through the machine, and thus may help with cooling. By providing the excitation system with a fan, it may be possible to increase the amount of airflow through the machine and thus improve cooling, with little or no increase in the axial length of the machine. Furthermore, the increased airflow may be predominately through the centre of the machine, where temperature rises may be highest.

In one embodiment, a fan is provided which attaches either to the rotor mount, or directly to the shaft of the main machine. However, in another embodiment, the fan is integral with the rotor mount.

According to another aspect of the invention there is provided a rotor mount for connecting a rotating component of an excitation system to a shaft of a main machine, the rotor mount comprising a fan. Any of the features described above may also be provided with this aspect of the invention.

The rotor mount may comprise a first mounting member for connecting to the common rotor core, a second mounting member for connecting to the shaft of the main machine, and a plurality of fan blades which connect the first mounting member and the second mounting member. Thus, the fan blades may be used to connect the first mounting member and the second mounting member (either on their own or with additional strengthening material). This arrangement can allow the rotor mount to serve the dual purpose of connecting the common rotor core to the shaft, and causing air flow through the machine, using a single part and with little or no additional axial space.

The rotor mount may comprise means for balancing rotating components of the machine. By providing the rotor mount with means for balancing, the rotor mount can serve the dual purpose of connecting the common rotor core to the shaft, and allowing the machine to be balanced, using a single part and with little or no additional axial space. Furthermore, this arrangement can allow rotating components of the machine to be balanced at the non-drive end of the machine, where access may be easier.

This feature may also be provided independently, and thus, according to another aspect of the invention, there is provided a rotor mount for connecting a rotating component of an excitation system to a shaft of a main machine, the rotor mount comprising a first mounting member for connecting to the rotating component, a second mounting member for connecting to the shaft of the main machine, and means for balancing rotating components of the machine.

The means for balancing may be for example a balance ring, or any other appropriate member. The means for balancing may have a plurality of holes for attaching balance weights. The means for balancing may be connected to the rotor mount (for example, bolted), or it may be integral with the rotor mount. The means for balancing may further comprise a hole or a slot through which an electrical connection (such as one or more wires) between the exciter and the main machine may pass.

In any of the above arrangements, the common rotor core may comprise at least one axial hole for accommodating an electrical connection (such as one or more wires) from the exciter to the main machine. This can allow a connection to be made from the non-drive end of the exciter, through the exciter to the rotor of the main machine. For example, where rotating diodes are provided on the non-drive end side of the excitation system, the rotating diodes may be connected to the main rotor through the axial hole in the common rotor core. Alternatively, where rotating diodes are provided on the drive end side of the excitation system, the exciter may be connected to the rotating diodes through the axial hole. In either case, the connection may also pass through an axial channel in a rotor mount and/or through a hole or slot in a balance disc.

In one embodiment, the auxiliary generator is a permanent magnet generator (PMG). In this embodiment, the common rotor core may comprise slots for accommodating permanent magnets. The slots may be distributed circumferentially about the common rotor core. The slots may be on the radially inwards side or on the radially outwards side of the common rotor core. The slots may run axially through the machine, and may be used to hold the magnets in place.

A slot may be formed on one side (radially) by a recess in the common rotor core and on the other side by webbing on the common rotor core. For example, where the magnets are to be located on the radially inwards side of the common rotor core, a slot may be formed on its radially outwards side by a recess in the common rotor core and on its radially inward side by webbing on the common rotor core. Since in operation centrifugal forces will tend to force the magnets outwards, this may reduce the forces on the webbing, thus reducing the likelihood of the webbing failing.

In a preferred embodiment, a plurality of slots is provided within a single webbing. Preferably, the plurality of slots within a single webbing accommodates magnets which form one pole of the permanent magnet machine. Thus, the magnets of one pole may be distributed circumferentially about the radially inward side of the common rotor core, within a single webbing. An air gap may be provided in a circumferential direction between adjacent slots within a webbing. This can allow the magnets to be held in place without creating additional magnetic flux paths between the magnets.

Preferably, the magnets of one pole are arranged in at least one column, the column comprising at least one magnet in an axial direction through a slot. For example, in some arrangements, a plurality of magnets may be provided in an axial direction through a slot. This may allow different configurations of magnets to be used in different circumstances.

For example, the slots may be arranged such that permanent magnets of the same size may be used in different configurations depending on the axial depth of the rotor core. Thus, a rotor with a longer core length may use fewer columns of magnets, but with more magnets in each column, while a rotor with a shorter core length may use more columns, but with fewer magnets in each column. This can allow the same lamination design and/or the same size magnets to be used in different sized rotors, thereby keeping down production costs.

This feature of the invention may also be provided independently. Thus, according to another aspect of the invention, there is provided a permanent magnet generator for providing excitation to an exciter, the permanent magnet generator comprising a rotor core with slots for accommodating permanent magnets, wherein a plurality of slots is provided for the magnets of one pole, and the magnets of one pole are arranged in at least one column, the column comprising at least one magnet in an axial direction through a slot. Preferably the slots are formed by recesses in the rotor core on one side and webbing on the other side, and the plurality of slots is provided within a single webbing. Any of the features described above may also be provided with this aspect.

In any of the above arrangements, the permanent magnet generator may comprise a stator core with a plurality of salient poles, and each of the poles may be wound with a coil. This may facilitate manufacture, for example by allowing automation of the winding process.

In another embodiment, the auxiliary generator is a reluctance machine, such as a switched reluctance generator or a synchronous reluctance generator. In this case, rather than permanent magnets, the common rotor core may comprise a plurality of poles which are magnetised in the appropriate sequence by windings in the auxiliary generator stator.

According to another aspect of the invention there is provided a rotating electrical machine comprising a main machine and an excitation system in any of the forms described above.

Where the exciter stator core and the auxiliary generator stator core are mounted on a bracket, the excitation system may be provided on the same side of the bracket as the main machine. In this case, the excitation system may be housed by a frame of the main machine, and the bracket.

Corresponding methods may also be provided. Thus, according to another aspect of the invention, there is provided a method of manufacturing an excitation system, the excitation system comprising an exciter and an auxiliary generator, the method comprising manufacturing the excitation system with separate stator cores and a common rotor core for the exciter and the auxiliary generator.

According to another aspect of the invention there is provided a method of mounting non-rotating components of an excitation system for providing excitation to a main rotating electrical machine, the method comprising mounting an exciter stator and an auxiliary generator stator on an inward facing side of a bracket for the rotating electrical machine. The bracket may be substantially disc-shaped, and may support a shaft of machine and/or may function to close an end of the machine.

According to another aspect of the invention there is provided a method of connecting a rotating component of an excitation system to a shaft of a main machine, the method comprising mounting the rotating component on a rotor mount comprising a plurality of fan blades.

According to another aspect of the invention there is provided a method of assembling a permanent magnet generator for providing excitation to an exciter, the permanent magnet generator comprising a rotor core with slots for accommodating permanent magnets, wherein a plurality of slots is provided for the magnets of one pole, the method comprising arranging the magnets of one pole in at least one column, the column comprising at least one magnet in an axial direction through a slot.

According to a further aspect of the invention there is provided a method of balancing a rotating electrical machine comprising a main machine and an exciter, wherein the exciter comprises balancing means, the method comprising balancing rotating components of the machine by adjusting the weight of the balancing means.

Features of one aspect of the invention may be provided with any other aspect. Apparatus features may be provided with method aspects and vice versa.

In the present specification terms such as "radially", "axially" and "circumferentially" are generally defined with reference to the axis of rotation of the main machine.

Preferred features of the present invention will now be described, purely by way of example, with reference to the accompanying drawings, in which:

FIGS. 10A and 10B show another embodiment of a non-drive end (NDE) bracket;

OVERVIEW OF EXCITATION SYSTEM

Figure 1:
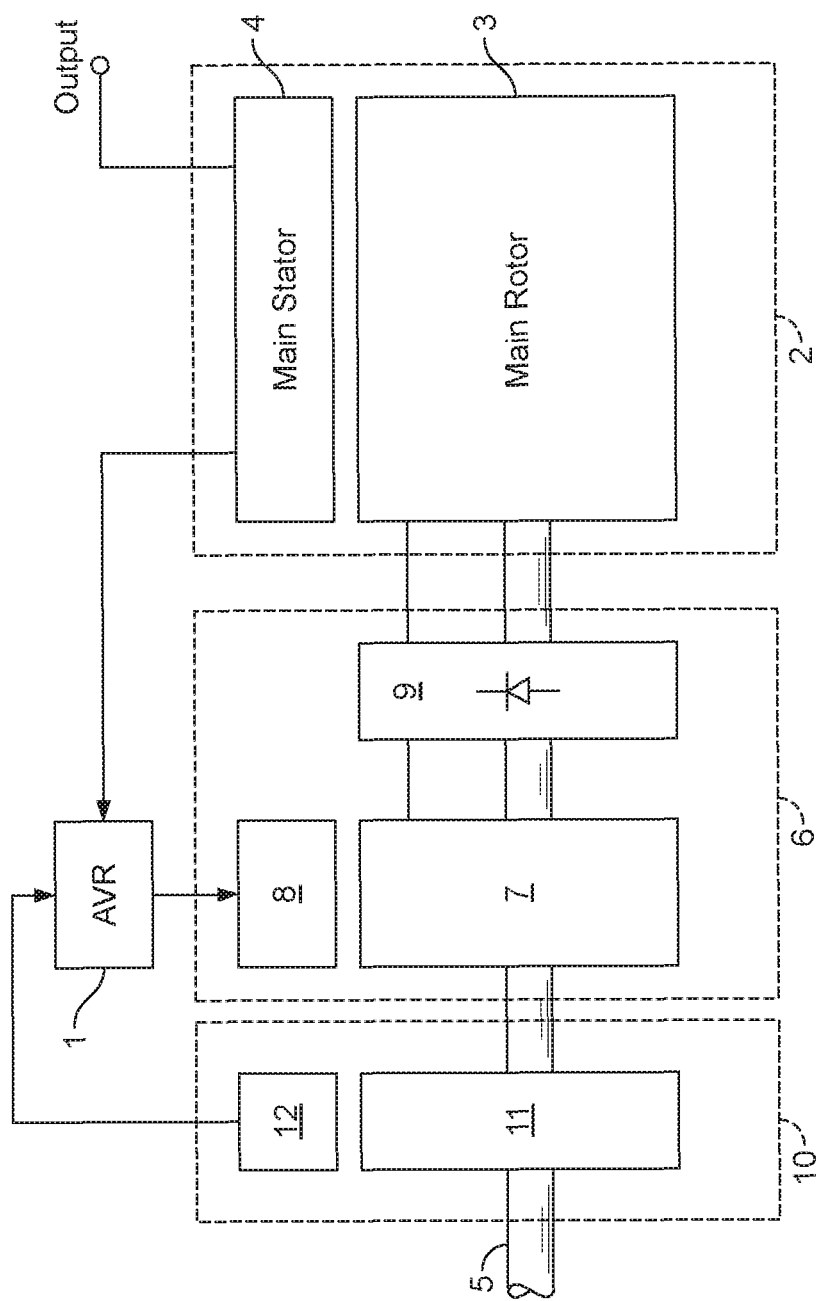
FIG. 1 shows an overview of a synchronous generator with an exciter and a PMG.

FIG. 1 shows an overview of a synchronous generator with an exciter and a PMG for supplying power to the exciter. Referring to FIG. 1, the generator includes a main machine 2 comprising a main rotor 3 and a main stator 4. The main rotor 3 is located on a shaft 5 which is driven by a prime mover such as a diesel engine (not shown). The main rotor develops a magnetic field, so that rotation of the main rotor relative to the main stator causes an AC output to be generated in the main stator windings.

The main rotor is magnetised by passing a DC current through the rotor windings. This DC current is generated by an exciter 6, which comprises exciter rotor 7, exciter stator 8, and rotating diodes 9. The exciter rotor 7 is mounted on the shaft 5, and rotation of the exciter rotor 7 relative to the exciter stator 8 generates an AC output in the exciter rotor windings. The AC output of the rotor 7 is converted to DC by the rotating diodes 9, and the DC output of the rotating diodes is fed to the main rotor 3.

In the arrangement of FIG. 1, power for the exciter 6 is drawn from a separate permanent magnet generator (PMG) 10 mounted on the same shaft as the main machine and the exciter. The PMG comprises rotor 11 and stator 12. The rotor 11 has a number of permanent magnets, which rotate to generate electrical power in windings in the stator 12. The output of the stator 12 is fed to the exciter 6 via an automatic voltage regulator (AVR) 1. The AVR functions to rectify the output of the PMG, and to control the amount of power fed from the PMG to the exciter. The AVR senses the output of the main stator 4 in order to control the power fed to the exciter. By controlling the relatively low power which is fed to the exciter stator, control of the high power in the main rotor is achieved through the rectified output of the exciter rotor.

Although for simplicity only single lines are shown in FIG. 1, the generator is typically a three-phase generator producing a three-phase output. In general, a generator having any number of phases could be used.

In an alternative arrangement, the main stator may provide the power for the exciter under normal operating conditions, while the PMG may contribute some or all of the power for the exciter under overload conditions. Such an arrangement is disclosed in International Patent Publication Number WO 2008/096117, the contents of which are incorporated herein by reference.

Combined Exciter/PMG

In embodiments of the present invention, the exciter and PMG are merged into one machine. In some embodiments, the exciter stator is located on the outside radially, and surrounds a combined rotor. The combined rotor has the exciter windings around the outer diameter and PMG magnets on the inner diameter. The PMG stator is located inside the combined rotor.

Figure 2:
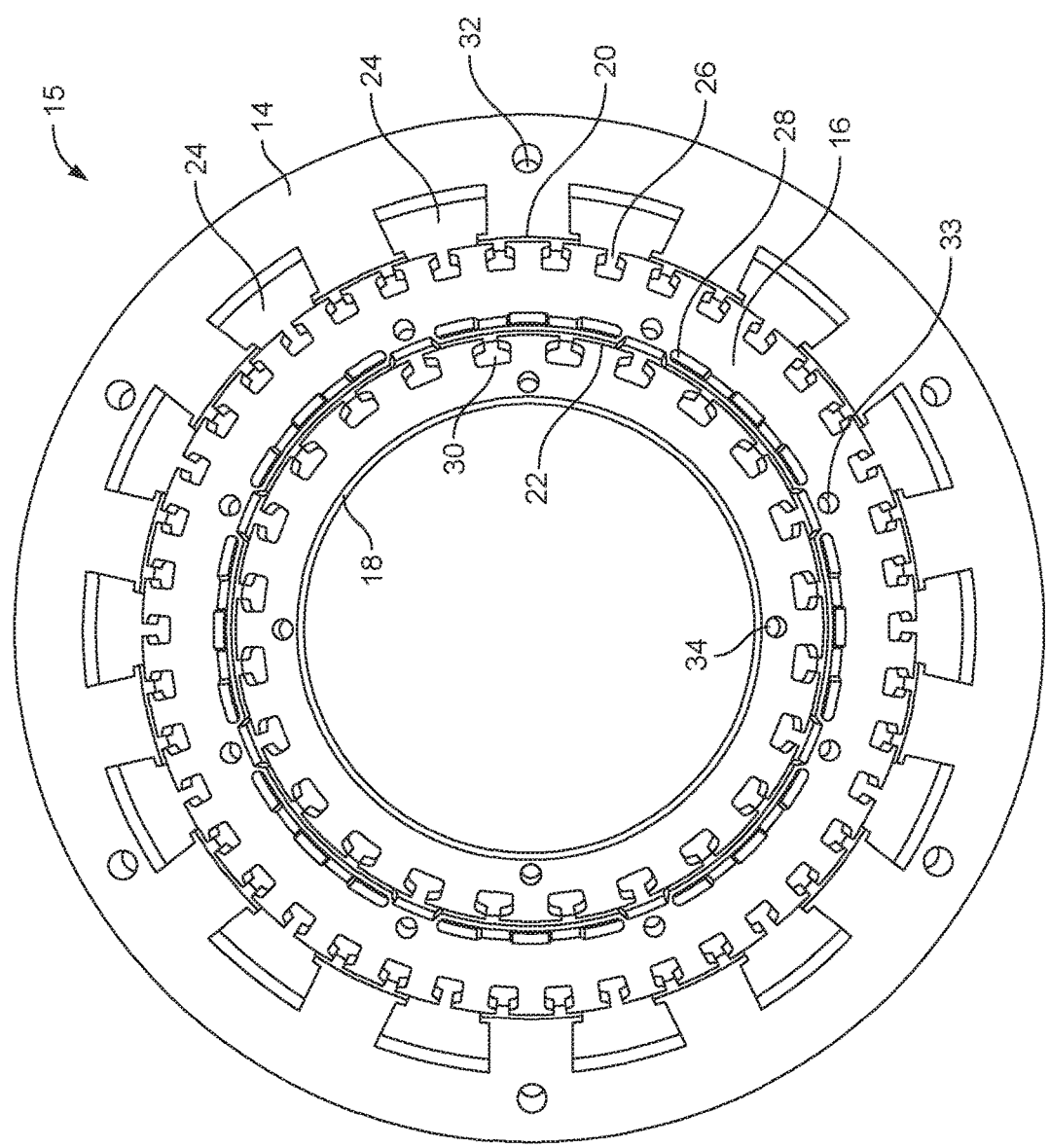
FIG. 2 shows parts of an excitation system in an embodiment of the invention.

FIG. 2 shows parts of an excitation system in an embodiment of the invention. Referring to FIG. 2, a combined exciter and PMG 15 comprises exciter stator core 14, combined exciter and PMG rotor core 16, and PMG stator core 18. The exciter stator core 14, combined exciter and PMG rotor core 16, and PMG stator core 18 are each substantially annular in shape. The exciter stator core 14 is located radially outwards of the combined exciter and PMG rotor core 16, which is itself located radially outwards of the PMG stator core 18. A first air gap 20 is provided between the exciter stator core 14, and the combined exciter and PMG rotor core 16. A second air gap 22 is provided between the combined exciter and PMG rotor core 16, and the PMG stator core 18.

The exciter stator core 14 has a plurality of slots 24 on its radially inwards side for accommodating exciter stator windings. The combined exciter and PMG rotor core 16 has a plurality of slots 26 on its radially outwards side for accommodating exciter rotor windings. The combined exciter and PMG rotor core 16 also has a plurality of slots 28 on its radially inwards side for accommodating permanent magnets. The PMG stator core 18 has a plurality of slots 30 on its radially outwards side for accommodating PMG stator windings.

Additionally, the exciter stator core 14 has a plurality of holes 32 for mounting the exciter stator to a non-rotating part of the main machine such as a non-drive end bracket. The combined exciter and PMG rotor core 16 has a plurality of holes 33 for mounting the rotor to a rotor mount. The PMG stator core 18 has a plurality of holes 34 for mounting the PMG stator to a non-rotating part of the main machine such as a non-drive end bracket. Mounting arrangements for the stators and the rotor will be described in more detail later.

For simplicity, in FIG. 2 the exciter stator core 14, the combined exciter and PMG rotor core 16 and the PMG rotor core 18 are shown without windings or magnets.

Figure 3:
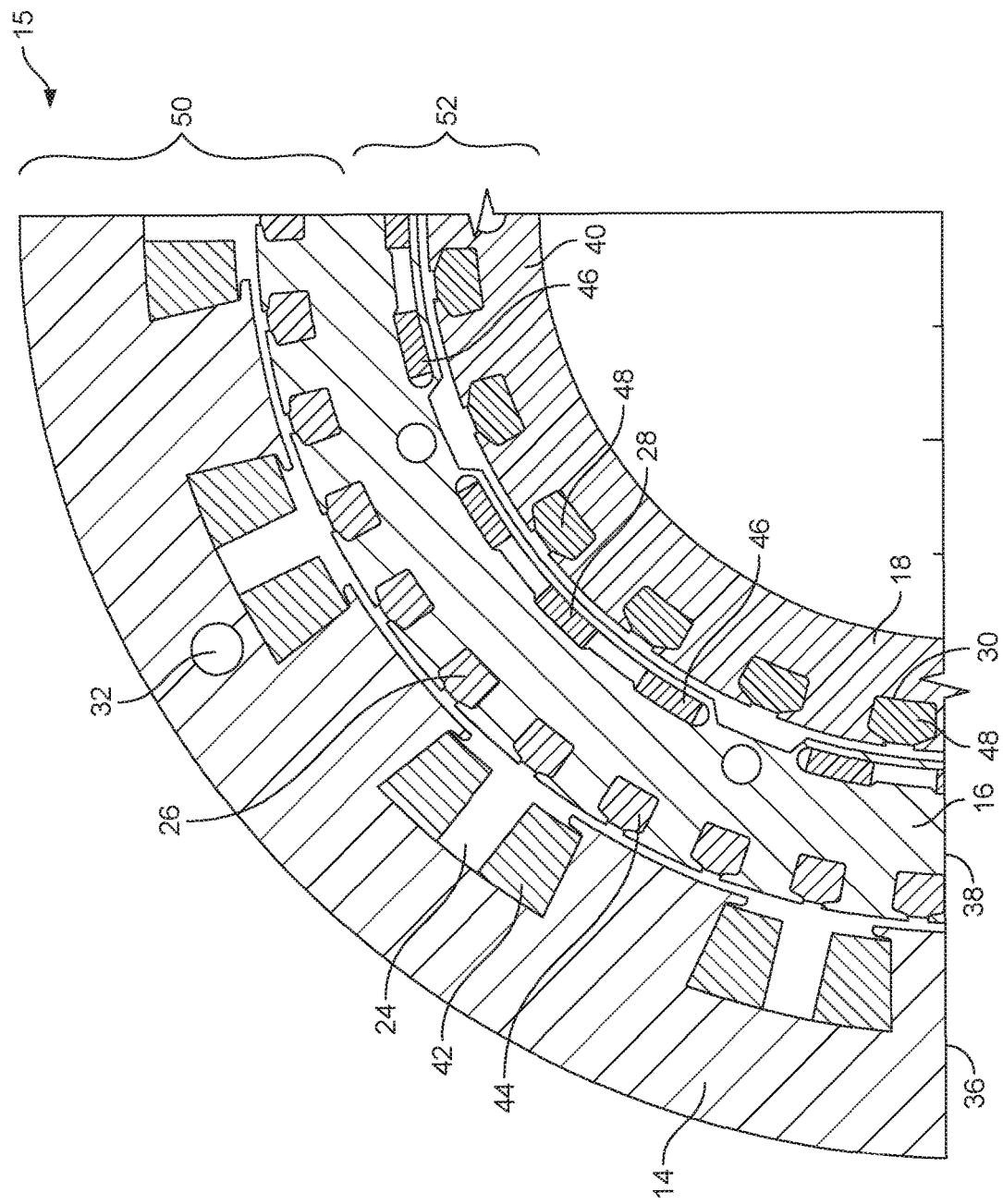
FIG. 3 shows a cross section through part of a combined exciter and PMG with windings and magnets in place.

FIG. 3 shows a cross section through part of the combined exciter and PMG 15, with the windings and magnets in place. Referring to FIG. 3, the combined exciter and PMG 15 comprises exciter stator 36, combined exciter and PMG rotor 38, and PMG stator 40. The exciter stator 36 comprises exciter stator core 14 with exciter stator windings 42 located in the slots 24. The combined exciter and PMG rotor 38 comprises the combined exciter and PMG rotor core 16, with exciter rotor windings 44 located in the slots 26, and a plurality of permanent magnets 46 located in the slots 28. The PMG stator 40 comprises PMG stator core 18 with PMG stator windings 48 located in the slots 30.

In operation, the combined exciter and PMG rotor 38 rotates between the exciter stator 36 and the PMG stator 40. The rotating permanent magnets 46 generate electrical power in the PMG stator windings 48. The output of the PMG stator windings is fed to the exciter stator windings 42 via an AVR. The exciter stator 36 thus develops an electromagnetic field, which causes electrical power to be generated in the exciter rotor windings 44. The output of the exciter rotor windings 44 is fed to the rotor of the main machine via rotating diodes.

In the arrangement of FIG. 3, the exciter stator 36 and the radially outwards part of the combined exciter and PMG rotor 38 cooperate to form an exciter 50. Similarly, the PMG stator 40 and the radially inwards part of the combined exciter and PMG rotor 38 cooperate to form a PMG 52. The combined rotor core 16 is designed with sufficient back iron (i.e. with a sufficient radial depth) to keep any interference between the two parts to acceptable levels. In a preferred embodiment, the depth of the combined rotor core (in a radial direction) is at least twice the depth of a slot 26 for exciter rotor windings.

In the arrangement of FIGS. 2 and 3, the exciter stator core 14, the combined rotor core 16, and the PMG stator core 18 may be suitably constructed from steel laminations. The laminations may then be stacked together to form cores of the required thickness in the axial direction.

Referring back to FIG. 2, it can be seen that the exciter stator core 14, the combined rotor core 16, and the PMG stator core 18 are concentric. This can allow all three cores to be punched from a single lamination. Furthermore, the combined rotor core 16 can be stamped as a single piece. By contrast, in a conventional excitation system, two or three laminations are typically required for the exciter and PMG. Thus, the arrangement of FIGS. 2 and 3 can reduce the amount of electrical steel consumed and reduce the number of parts, leading to reduced manufacturing costs. In addition, a single impregnation process can be used for the combined rotor, further reducing costs.

The arrangement of FIGS. 2 and 3 uses a single rotating component between two static components. This may also provide the advantage that the mass of the rotating components is reduced, in comparison to the case where more than one rotating component is used. As a consequence, smaller bearings can be used, further reducing manufacturing costs. Alternatively, if the same bearings are used, then the bearing life will be extended by virtue of the reduced weight of the rotating components of the excitation system.

Another advantage of the arrangement described above is that inclusion of the PMG 52 can be made optional. For example, in some applications it may not be necessary for the excitation system to include a PMG. In this case, the PMG stator 40 and the PMG magnets 46 can be omitted, allowing the excitation system to be provided at lower cost. Alternatively, the combined rotor 38 could be replaced with an exciter rotor without slots for the magnets, while keeping the same exciter stator. This can allow different configurations to be provided while keeping some of the same components, leading to reduced inventory and manufacturing costs.

An additional advantage of the above arrangement is that the overall amount of permanent magnet material required may be reduced in comparison to the standard PMG, due to the fact that the permanent magnets are located at an increased radius. Since the permanent magnets are typically rare earth magnets, which tend to be expensive and subject to high price volatility, reducing the amount of magnetic material required can help to reduce the cost of manufacture.

In an alternative arrangement, the PMG stator is located on the outside radially and surrounds the combined rotor, while the exciter stator is located inside the combined rotor. In this arrangement, the PMG stator has stator windings on its radially inward side; the combined rotor has PMG magnets on its radially outwards side and exciter rotor windings on its radially inwards side; and the exciter stator has exciter stator windings on its radially outwards side. This arrangement can allow the amount of permanent magnet material and windings in the PMG to be reduced, due to the larger diameter of the PMG. Thus, this arrangement may be preferred in situations where a smaller exciter will be suitable for exciting the main machine.

Magnet Retention

Figure 4:
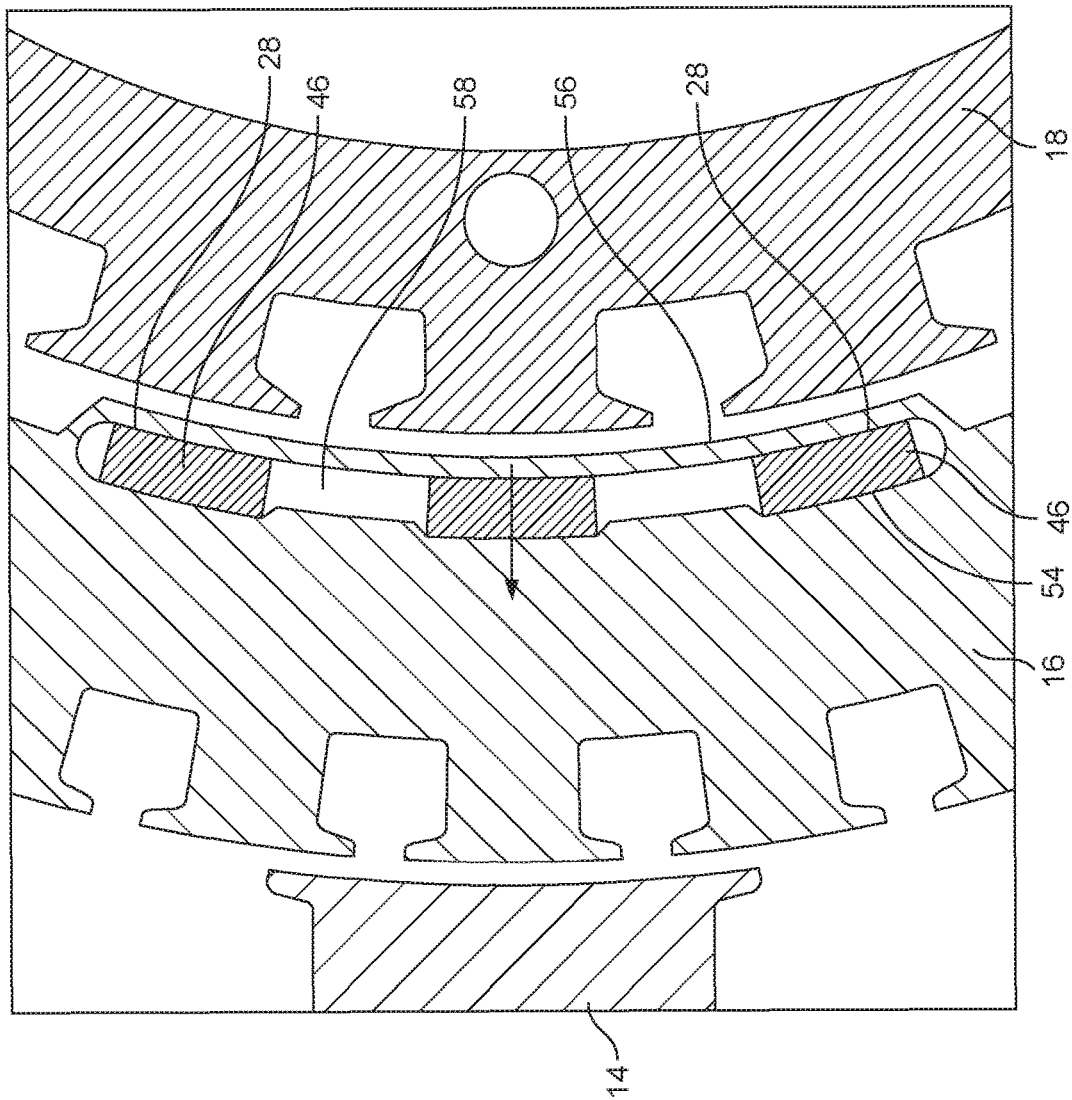
FIG. 4 shows a cross section through part of the combined exciter and PMG in more detail.

FIG. 4 shows a cross section through part of the combined exciter and PMG 15 in more detail. Referring to FIG. 4, it can be seen that the slots 28 for the PMG magnets 46 are formed by recesses 54 in the rotor core 16 on the radially outwards side of the magnets, and steel webbing 56 on the radially inwards side of the magnets. In this example three slots 28 are provided within one webbing 56. The webbing 56 is designed to retain the permanent magnets of one pole of the PMG.

FIG. 4 also shows permanent magnets 46 located within the slots 28. The permanent magnets 46 are spaced circumferentially on the radially inwards side of the rotor core 16. Air gaps 58 are provided between the magnets 46 in a circumferential direction. The recesses 54 and the webbing 56 allow the magnets to be held in place without requiring additional webbing between the magnets, which would create additional magnetic flux paths and reduce the performance.

The magnets 46 are preferably rare earth magnets, although other types of magnet such as ferrite magnets may be used instead. During assembly, the magnets are glued into place in the slots 28. The entire rotor, once assembled, may be dipped in resin to help with retention of the magnets and the windings.

In conventional PMGs, the magnets are on the outer diameter of the rotor. This places mechanical strain on the webbing which is used to hold the magnets inside the lamination while the rotor spins. This may lead to failure of the webbing if it is insufficiently designed.

In the present arrangement, the PMG magnets 46 are placed around the inner diameter of the rotor core 16. Thus, when the rotor spins, the direction of the centrifugal force on the magnets 46 is towards the centre of the rotor core 16, as indicated by the arrow in FIG. 4. This can reduce or eliminate the stresses placed on the steel web 56 by the mass of the magnets while rotating. This in turn may lead to improved reliability, as the magnets will no longer break the steel web while in overspeed conditions.

In some circumstances it may be desirable to provide an exciter with an increased core length in the axial direction, in order to increase the amount of excitation that can be provided to the main machine. However, in order to keep costs down, it may be possible to use a similar PMG for different sized exciters.

Referring again to FIG. 4, in this embodiment the three slots 28 within the webbing 56 can allow different configurations of magnets to be used in different circumstances. For example, the magnets may be arranged in columns, with a plurality of magnets in an axial direction within each slot. In this case, a rotor with a longer core length may use fewer columns of magnets, but with more magnets in each column. This can allow the same lamination design and the same size magnets to be used in different sized rotors, thereby keeping down production costs.

For example, in one possible configuration a rotor with a core length of 40 mm may use three columns of two 20 mm magnets, while a rotor with a core length of 60 mm may use two columns of three 20 mm magnets. Of course, it will be appreciated that different core sizes, magnet sizes and numbers of magnets may be used as appropriate.

In the arrangement of FIG. 4, the gaps 58 between the magnets are designed to cancel out harmonics in a short core version (i.e. with three columns of magnets). In a long core version, the magnets could either be located in the two end columns, or else in two adjacent columns. Locating the magnets in the two end columns would give lower harmonics, while locating the magnets in two adjacent columns would give a higher output. If desired, a single column arrangement could also be used. Thus, the configuration can be chosen depending on the required performance characteristics.

Mounting Arrangement

Figure 5B:
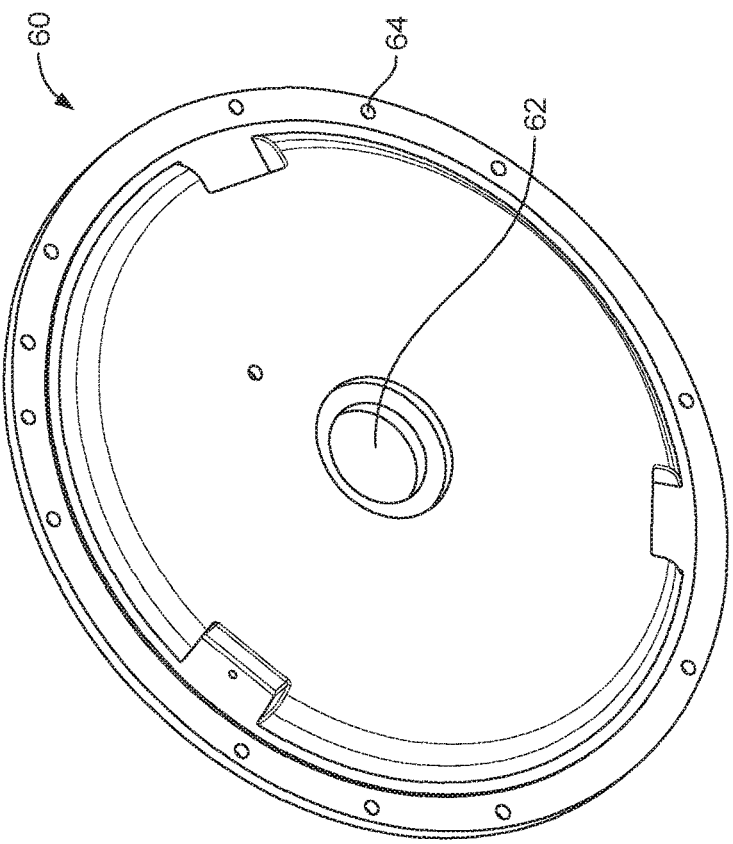
FIGS. 5A and 5B show a bracket for use with the combined exciter and PMG.
Figure 5A:
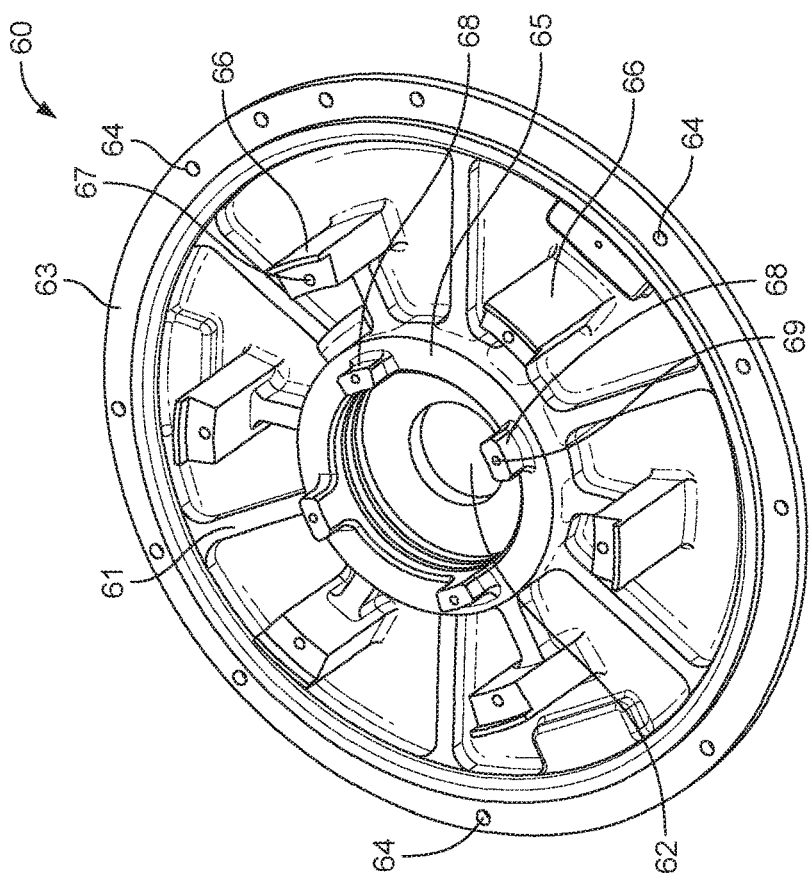

FIGS. 5A and 5B are views of a bracket for use with the combined exciter/PMG 15 of FIGS. 2 to 4. The bracket is designed to attach to the non-drive end (NDE) of the main rotating electrical machine, and to support the shaft. FIG. 5A shows the inward facing side of the bracket (i.e. the side which faces the main machine), while FIG. 5B shows the outward facing side of the bracket (i.e. the side which faces away from the main machine).

The bracket 60 of FIGS. 5A and 5B is generally disc-shaped, with a hole 62 in the centre. A circular mating face 63 is provided around the outside of the bracket, for mating with the frame of the main machine. A plurality of bolt holes 64 is provided in the mating face for bolting the bracket to the frame. A bearing support member 65 is provided for supporting a bearing. The bearing support member is in the form of an annular protrusion from the inward facing side of the bracket 60, close to the centre of the bracket. A plurality of radial ribs 61 is provided on the inward facing side of the bracket. The ribs 61 run between the bearing support member 65 and the mating face 63, and help to provide strength and rigidity to the bracket.

Referring to FIG. 5A, the bracket 60 comprises a plurality of excitation stator mounting members 66 for supporting the exciter stator. The mounting members 66 are in the form of protrusions which extend axially out of the inward facing side of the bracket 60. The mounting members 66 are spaced in a generally circular configuration about the inner face of the bracket. Bolt holes 67 are provided in the ends of the mounting members 66.

The bracket 60 also comprises a plurality of PMG stator mounting members 68 for supporting the PMG stator. The PMG stator mounting members 68 are in the form of axial protrusions on the inward facing side of the bracket 60. The PMG stator mounting members 68 are spaced in a generally circular configuration, radially inwards of the excitation stator mounting members 66. In this example, the PMG stator mounting members 68 extend outwards from the bearing support member 65, although it would also be possible for them to be located elsewhere, depending on the configuration of the bearing and the PMG. Bolt holes 69 are provided in the ends of the PMG stator mounting members 68.

As can be seen from FIG. 5A, the excitation stator mounting members 66 and the PMG stator mounting members 68 are both located on the inward facing side of the bracket 60. This can allow the excitation system to be located inside the frame of the main machine. This may help to provide ingress protection and reduce the likelihood of external bodies coming into contact with rotating parts. Furthermore, this arrangement may help to reduce the number of components required, and reduce the overall length of the electrical machine.

The bracket 60 of FIGS. 5A and 5B may also be used to feed wires from the PMG stator windings 48 to an AVR, and to feed wires from the AVR to the exciter stator windings 42.

In the arrangement of FIG. 3, the exciter stator 36 and the radially outwards part of the combined exciter and PMG rotor 38 cooperate to form an exciter 50. Similarly, the PMG stator 40 and the radially inwards part of the combined exciter and PMG rotor 38 cooperate to form a PMG 52. The combined rotor core 16 is designed with sufficient back iron (i.e. with a sufficient radial depth) to keep any interference between the two parts to acceptable levels.

Figure 6:
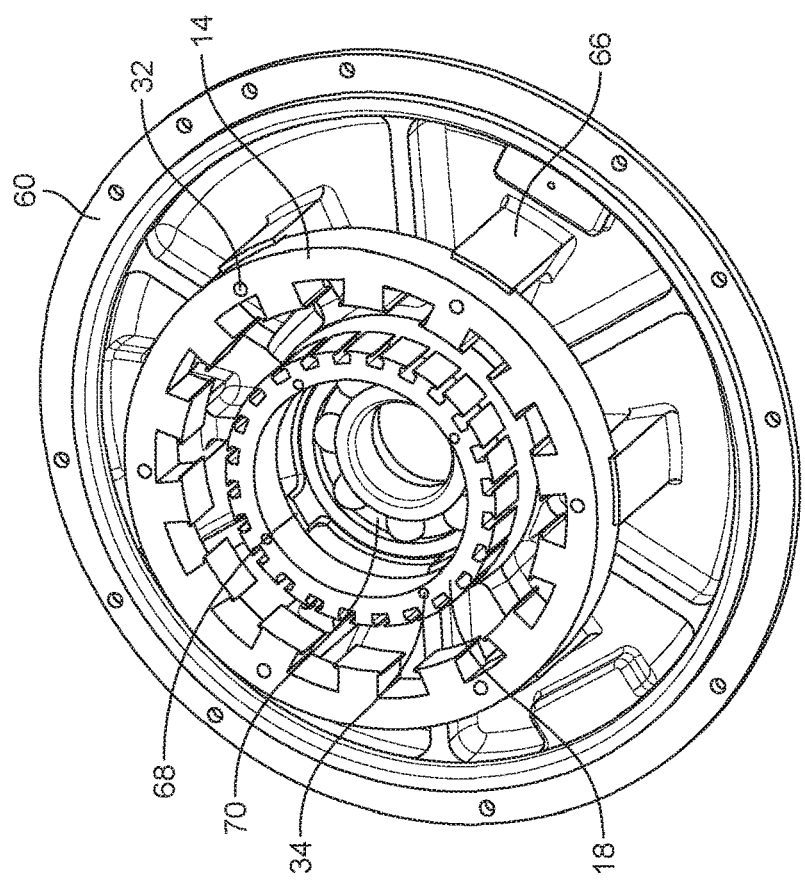
FIG. 6 shows an exciter stator core and a PMG rotor core mounted on the bracket.

FIG. 6 shows parts of the combined exciter/PMG, with the exciter stator core 14 and the PMG rotor core 18 mounted on the bracket 60. Referring to FIG. 6, the exciter stator core 14 is mounted on the excitation stator mounting members 66, and the PMG stator core 18 is mounted on the PMG stator mounting members 68. In the assembled machine, bolts (not shown) pass through the bolt holes 32 and into the bolt holes 67 in order to secure the exciter stator core 14 to the excitation stator mounting members 66. Similarly, bolts (not shown) pass through the bolt holes 34 and into the bolt holes 69 in order to secure the PMG stator core 18 to the PMG stator mounting members 68. For simplicity, in FIG. 6 the exciter stator core 14 and the PMG rotor core 18 are shown without windings. However, it will be appreciated that in the assembled machine the cores 14, 18 are mounted to the bracket 60 with the respective windings in place.

FIG. 6 also shows a bearing 70 located inside the bearing support member 65. The bearing 70 is designed to support a shaft of the rotating electrical machine.

Figure 7:
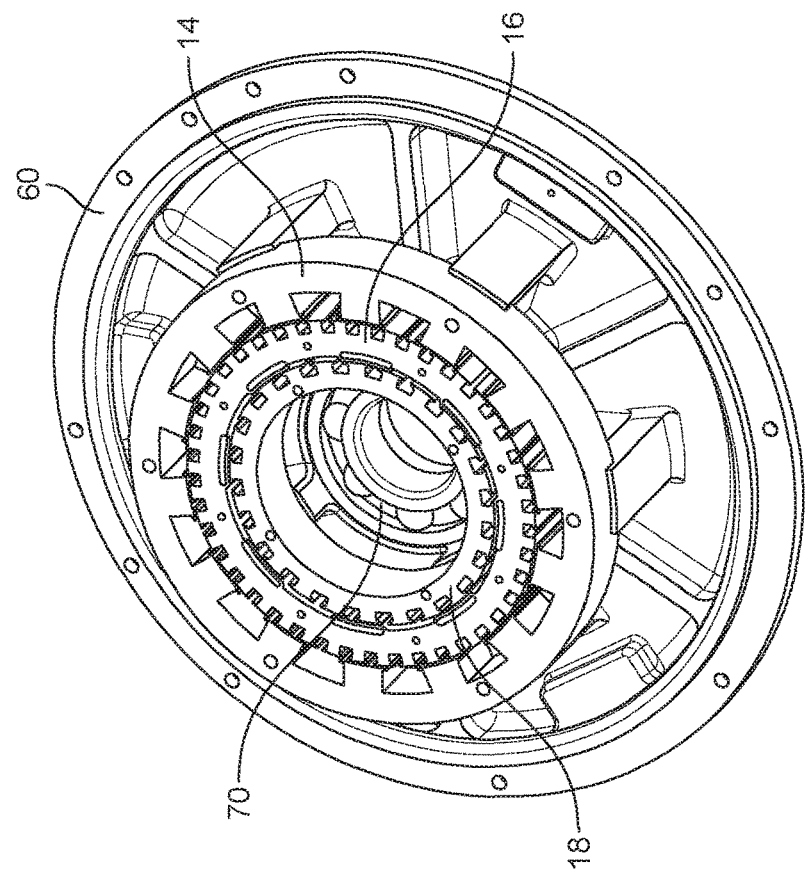
FIG. 7 shows the arrangement of FIG. 6 with the addition of a combined rotor core.

FIG. 7 shows parts of the combined exciter/PMG, with the combined rotor core in place. Referring to FIG. 7, it can be seen that the combined rotor core 16 is located between the exciter stator core 14 and the PMG rotor core 18. Again, for simplicity the rotor core 16 is shown without windings or magnets.

Figure 8:
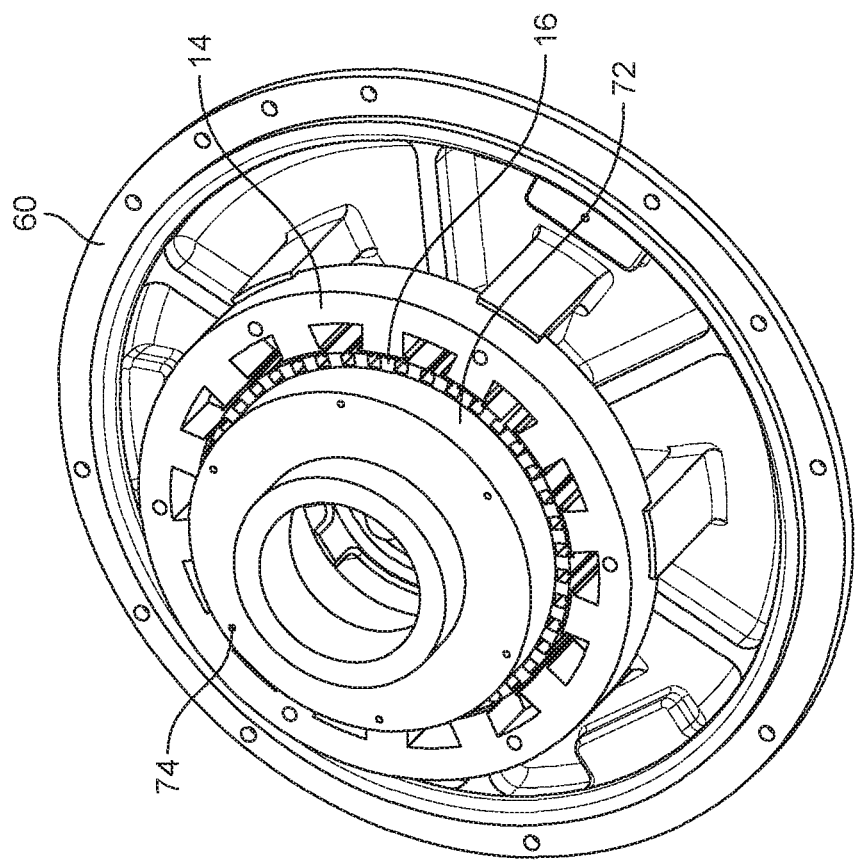
FIG. 8 shows the arrangement of FIG. 7, with the addition of a rotor mount.

FIG. 8 shows the arrangement of FIG. 7, with the addition of a rotor mount for supporting the combined rotor. Referring to FIG. 8, a rotor mount 72 is located on the inward facing side of the combined exciter/PMG (i.e. the side facing the main machine). The rotor core 16 is secured to the rotor mount 72 by means of bolts which pass through bolt holes 74 in the rotor mount, and into the bolt holes 33 in the rotor core 16. In the assembled machine, the rotor mount 72 is secured to the shaft of the main rotating electrical machine. Rotating diodes (not shown in FIG. 8) may be attached to the rotor mount 72.

In the arrangement of FIG. 8 the rotor mount 72 is designed to attach directly to the shaft of the main machine. However, the rotor mount 72 could alternatively attach to a rotor hub which is attached to the shaft.

Figure 9:
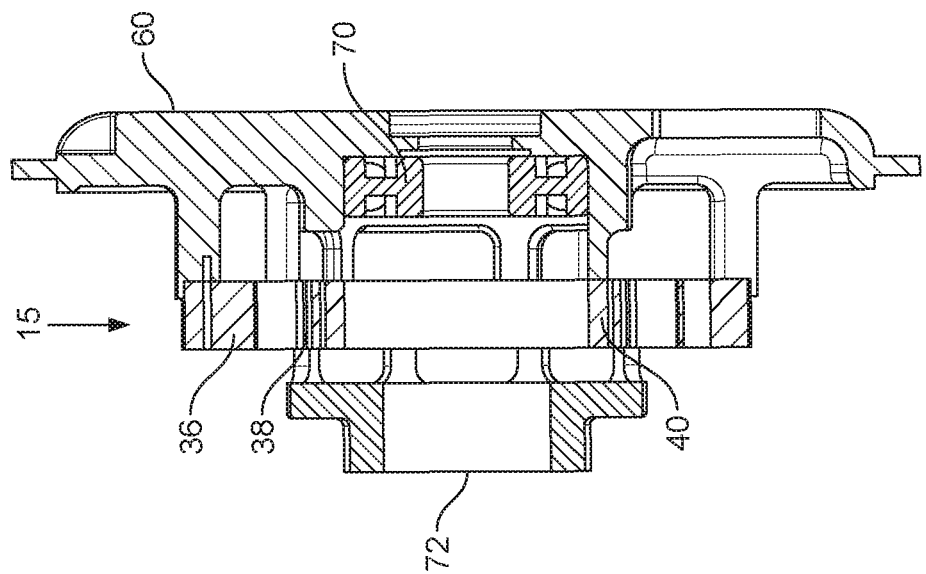
FIG. 9 is a cross section through the combined exciter/PMG.

FIG. 9 is a cross section through the combined exciter/PMG. In the assembled machine, the main shaft passes through the rotor mount 72 and the combined exciter/PMG 15, and is supported by the bearing 70. The rotor mount 72 is attached to the shaft, such that rotation of the shaft causes the combined rotor 38 to rotate inside the exciter stator 36 and around the PMG stator 40. The exciter stator 36 and the PMG stator 40 are held in place by the bracket 60, which is attached to the frame of the main machine.

The combined exciter/PMG may be assembled by carrying out the following steps: mounting the exciter stator core 14, the PMG stator core 18 and the bearing 70 on the bracket 60 to form a bracket assembly; mounting the combined rotor core 16 on the rotor mount 72 to form a rotor mount assembly; securing the rotor mount assembly to the shaft of the machine; bringing the bracket assembly onto the rotor mount assembly such that the combined rotor core 16 is located between the exciter stator core 14 and the PMG stator core 18 and the bearing 70 supports the shaft; and securing the bracket 60 to the frame of the machine. These steps may be carried out in any appropriate order.

FIGS. 10A and 10B show another embodiment of a NDE bracket for use with the combined excitation system described above. FIG. 10A shows the inward facing side of the bracket, while FIG. 10B shows the outward facing side of the bracket. In this embodiment, a plurality of ventilation holes is provided for allowing air flow into the machine.

Referring to FIG. 10A, the bracket 76 includes excitation stator mounting members 66 and PMG stator mounting members 68. Ventilation holes 78 are provided in the bracket between adjacent excitation stator mounting members 66. In this embodiment, radial ribs 77 are co-located circumferentially with the excitation stator mounting members 66. The ribs 77 run between the bearing support member 65 and the mating face 63, and help to provide strength and rigidity to the bracket. The excitation stator mounting members 66 extend out of the radial ribs 77 in an axial direction. The ventilation holes 78 are substantially wedge shaped, and extend between adjacent ribs. Thus, the ventilation holes are provided between the main structural parts of the bracket, thereby minimising any impact on the strength of the bracket.

In operation, the ventilation holes 78 can allow air to pass through the bracket 76 and into the main rotating electrical machine, thereby improving cooling of the machine. The airflow may be generated, for example, by a fan at the drive end and/or the non-drive end of the machine.

Figure 11B:
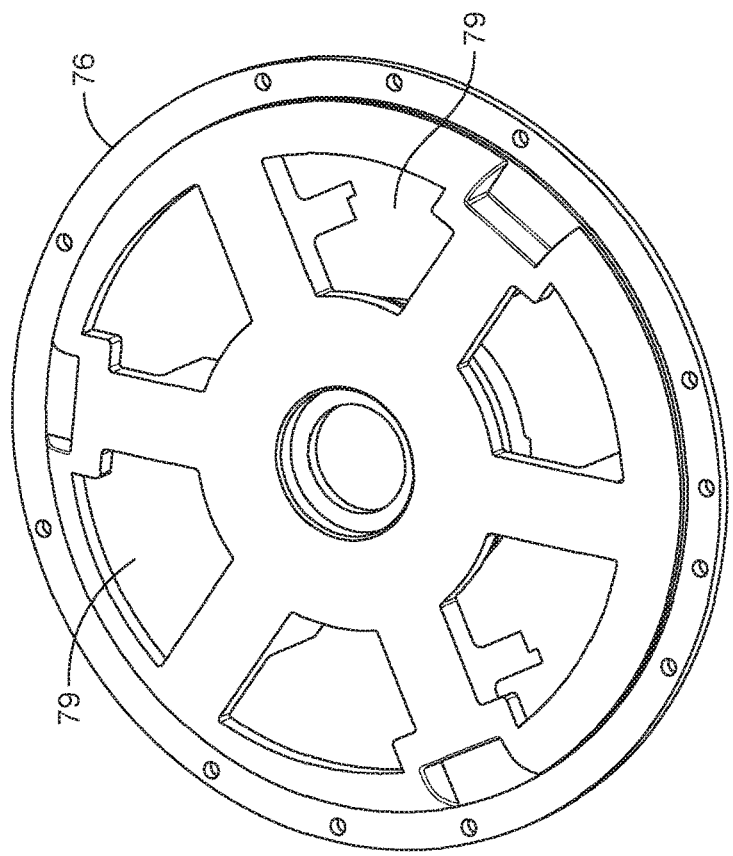
FIGS. 11A and 11B show a further embodiment of a NDE bracket.
Figure 11A:
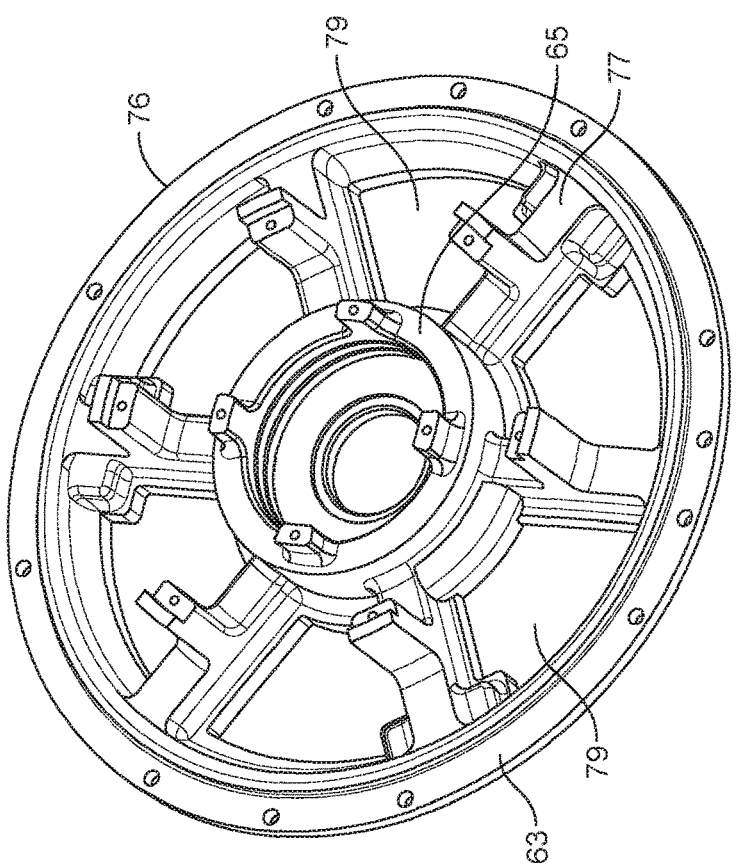

FIGS. 11A and 11B show a further embodiment of a NDE bracket for use with the combined excitation system. The arrangement of FIGS. 11A and 11B is similar to that of FIGS. 10A and 10B, but with larger ventilation holes 79. In this embodiment, the ventilation holes 79 extend between adjacent ribs 77 in a circumferential direction, and between the bearing support member 65 and the mating face 63 in a radial direction. Thus, the size of the ventilation holes is maximised while still retaining the structural integrity of the bracket. Of course, it will be appreciated that in practice the size and shape of the ventilation holes can be chosen to suit the particular application.

Figure 13:
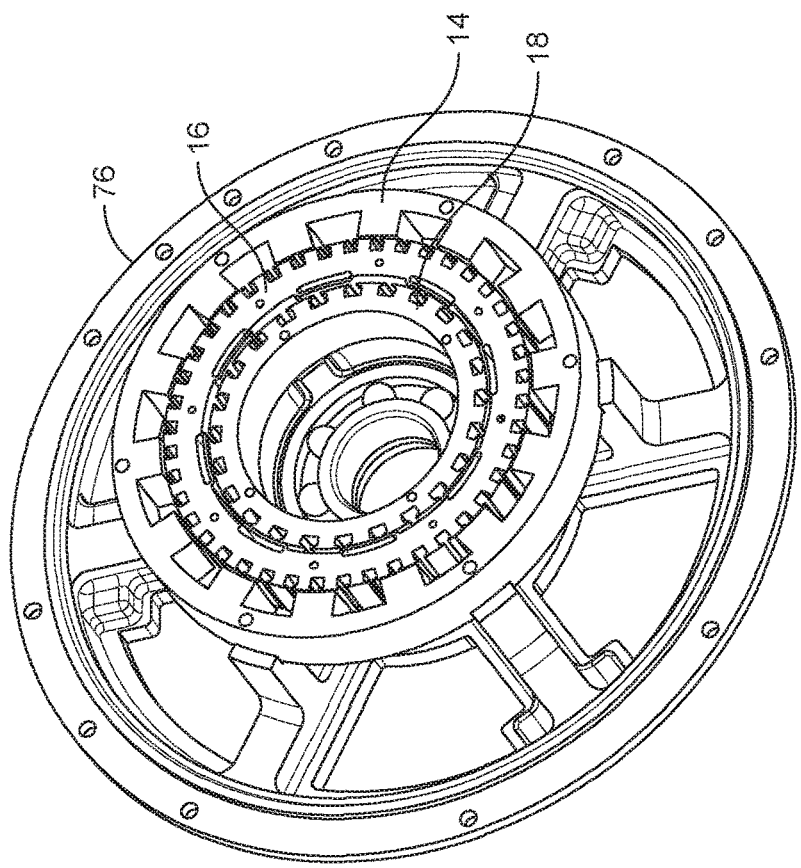
FIG. 13 shows the arrangement of FIG. 12, with the addition of the combined rotor core.
Figure 12:
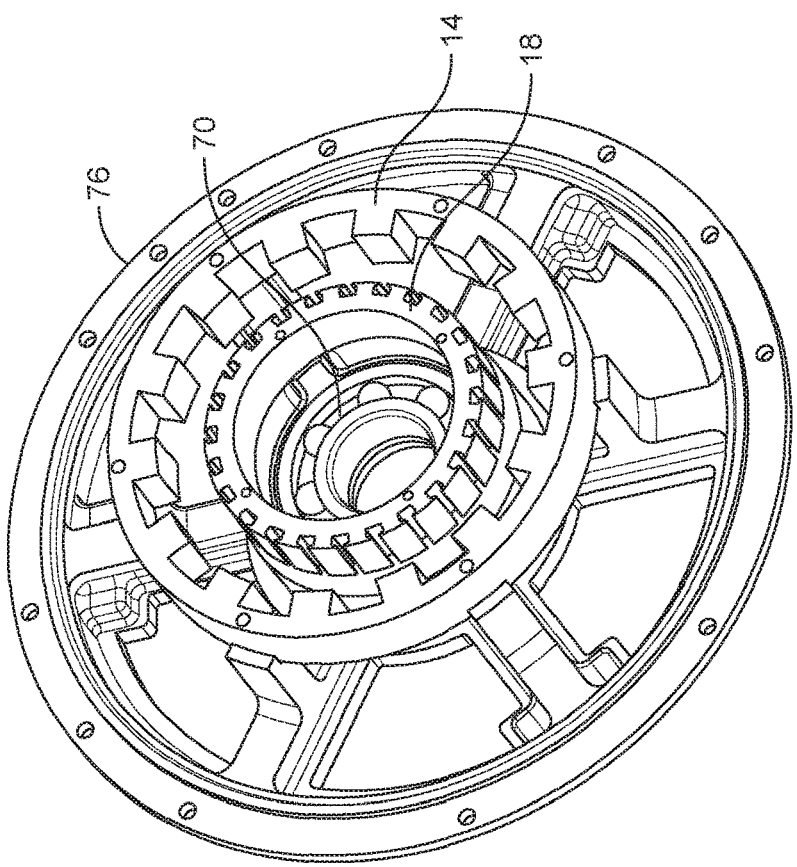
FIG. 12 shows the exciter stator core and the PMG rotor core mounted on the bracket.

FIG. 12 shows parts of the combined exciter/PMG, with the exciter stator core 14 and the PMG rotor core 18 mounted on the bracket 76. FIG. 12 also shows a bearing 70 located inside the bearing support member 65. FIG. 13 shows the arrangement of FIG. 12, with the addition of the combined rotor core 16.

Figure 15:
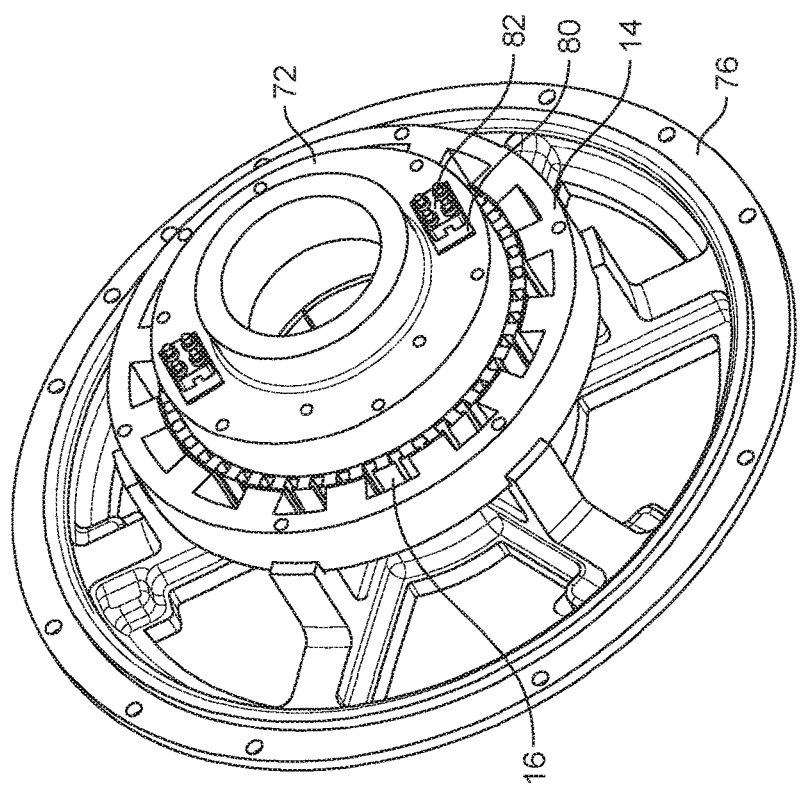
FIG. 15 shows the arrangement of FIG. 14, with the addition of rotating diodes.
Figure 14:
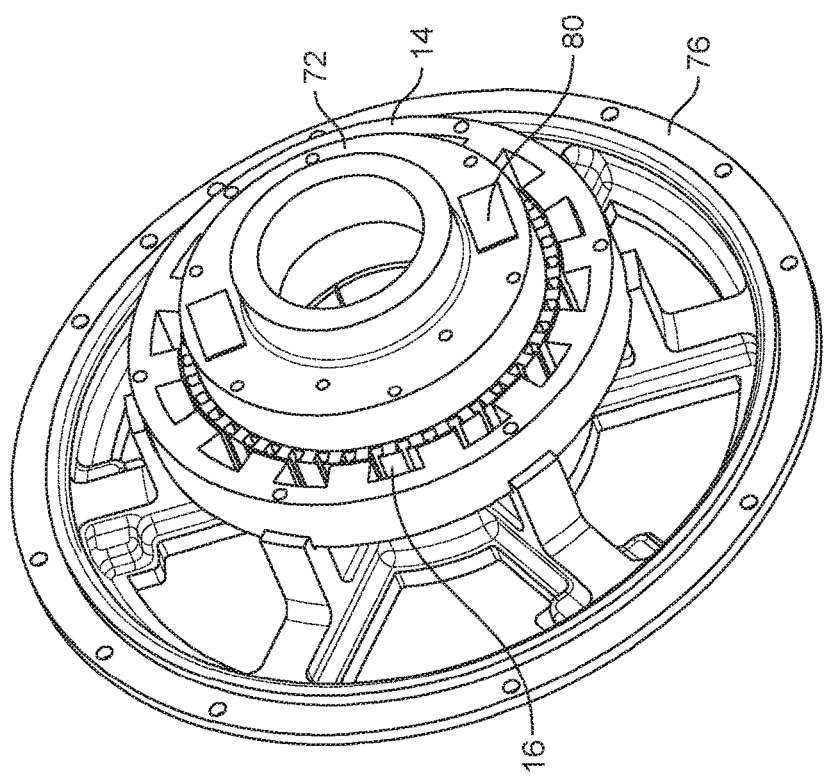
FIG. 14 shows the arrangement of FIG. 13, with the addition of a rotor mount.

FIG. 14 shows the arrangement of FIG. 13, with the addition of a rotor mount 72. In the arrangement of FIG. 14, slots 80 are provided in the rotor mount 72 for accommodating rotating diodes. FIG. 15 shows the arrangement of FIG. 14, with the addition of rotating diodes. Referring to FIG. 15, the rotating diodes 82 are located in the slots 80 in the rotor mount 72. The rotating diodes 82 are used to convert the AC output of the exciter rotor windings 44 to DC for supply to the rotor windings in the main machine.

Figure 16:
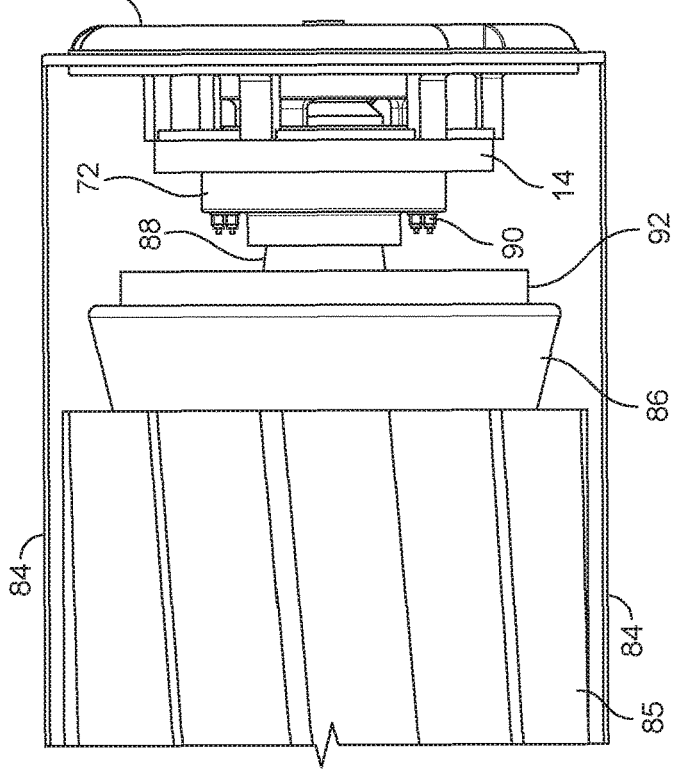
FIG. 16 is a side view of part of the assembled machine.

FIG. 16 is a side view of part of the assembled machine. Referring to FIG. 16, the rotating electrical machine is housed inside a frame 84. The machine includes a main stator comprising stator core 85 and stator windings 86. The rotor of the main machine is located inside the stator core 85, and is mounted on a shaft 88. The exciter stator core 14 and the PMG rotor core 18 are mounted on the bracket 76 in the way described above. The bracket 76 is attached to the frame 84. The combined exciter and PMG rotor core 16 is mounted on the rotor mount 72 by means of bolts 90. The rotor mount 72 is attached to the shaft 88. The shaft 88 is supported by the bearing 70 mounted on the bracket 76 (inside the bearing support member 65).

Also shown in FIG. 16 is a non-drive end fan 92 which is mounted on the shaft 88. The non-drive end fan 92 can help to produce air flow through the main machine, thereby improving the cooling. In the arrangement shown, the fan 92 is attached directly to the shaft 88. However, in an alternative arrangement, the fan could be attached to the rotor mount 72, or to a separate hub.

Figure 17:
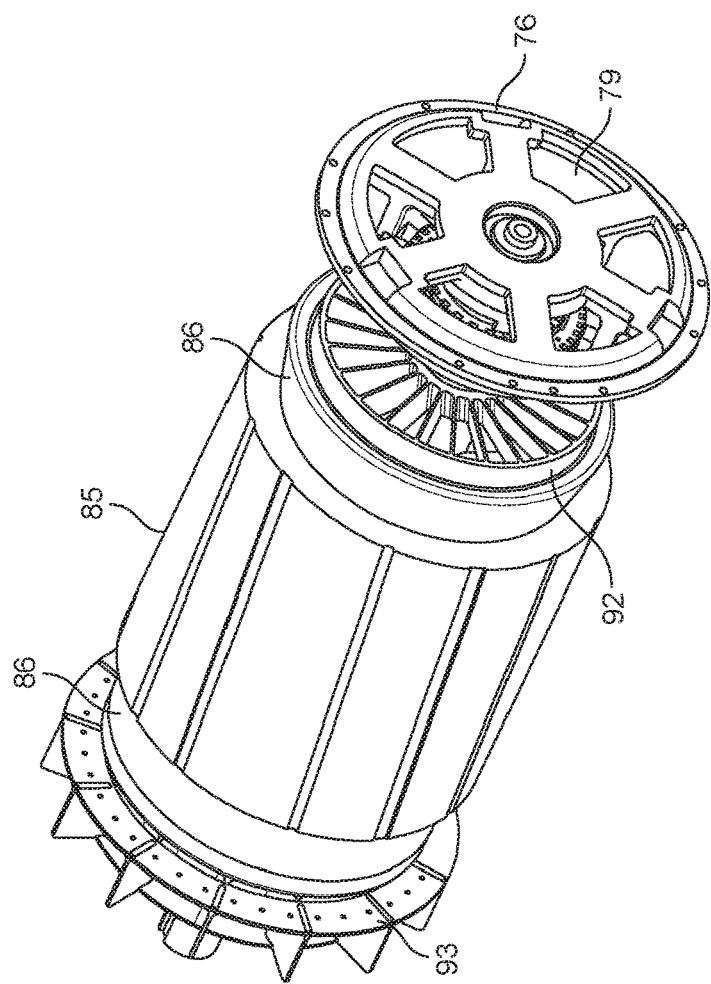
FIG. 17 is a perspective view of the assembled machine.

A perspective view of the assembled machine without the frame is shown in FIG. 17. In the arrangement shown, a drive end fan 93 is located at the drive end of the main machine. The drive end fan 93 and the non-drive end fan 92 both act to draw air axially through the machine. Air flow may be at least partially through the ventilation holes 79 in the bracket 76.

The arrangements described above can allow the excitation system to be located inside of the frame and the non-drive end bracket. This can provide increased ingress protection, and reduce the likelihood of external bodies coming into contact with rotating components. Furthermore, this arrangement can avoid the need for a separate cowling to protect rotating parts, which may reduce the overall length of the machine, and reduce the number of parts.

Figure 18:
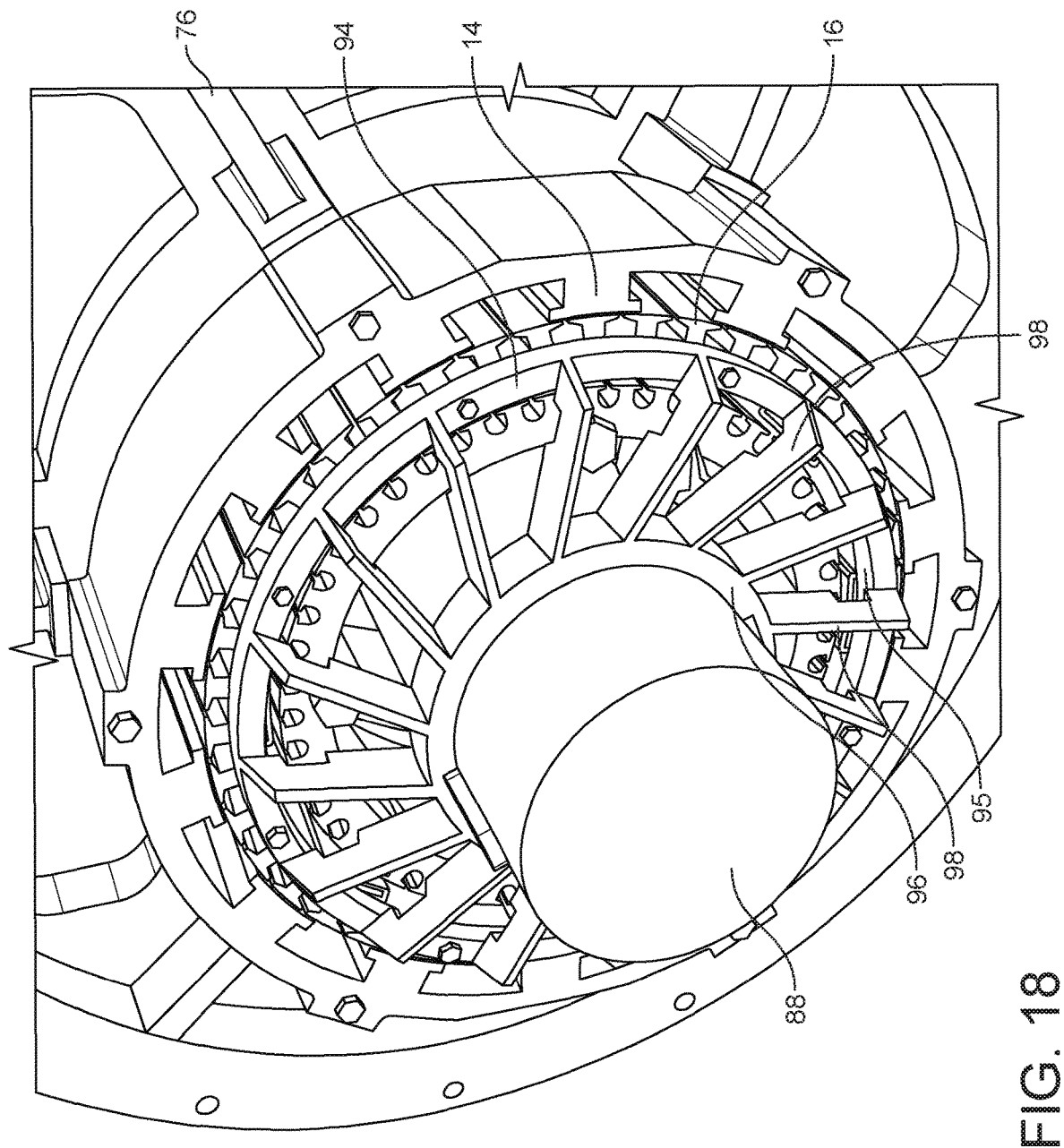
FIG. 18 shows parts of an excitation system with an alternative rotor mount design.

FIG. 18 shows parts of an excitation system with an alternative rotor mount design. Referring to FIG. 18, the rotor mount 94 in this embodiment includes a ring-shaped outer member 95, a ring-shaped inner member 96, and fan blades 98 which connect the outer member to the inner member. The inner member 96 is mounted on the rotor shaft 88, while the combined exciter and PMG rotor 16 is mounted on the outer member 95.

In operation, as the rotor mount 94 rotates, the fan blades 98 draw cooling air through the machine. Thus, the rotor mount in this embodiment serves the dual purpose of providing a mount for the combined exciter and PMG rotor 16, and acting as a non-drive end cooling fan. This allows for improved cooling in electrical machines while not requiring additional length in the product. The rotor mount of this embodiment utilises free space by drawing air through the centre of and around the machine and acting as a stable mount for the rotor.

FURTHER EMBODIMENTS

Figure 19:
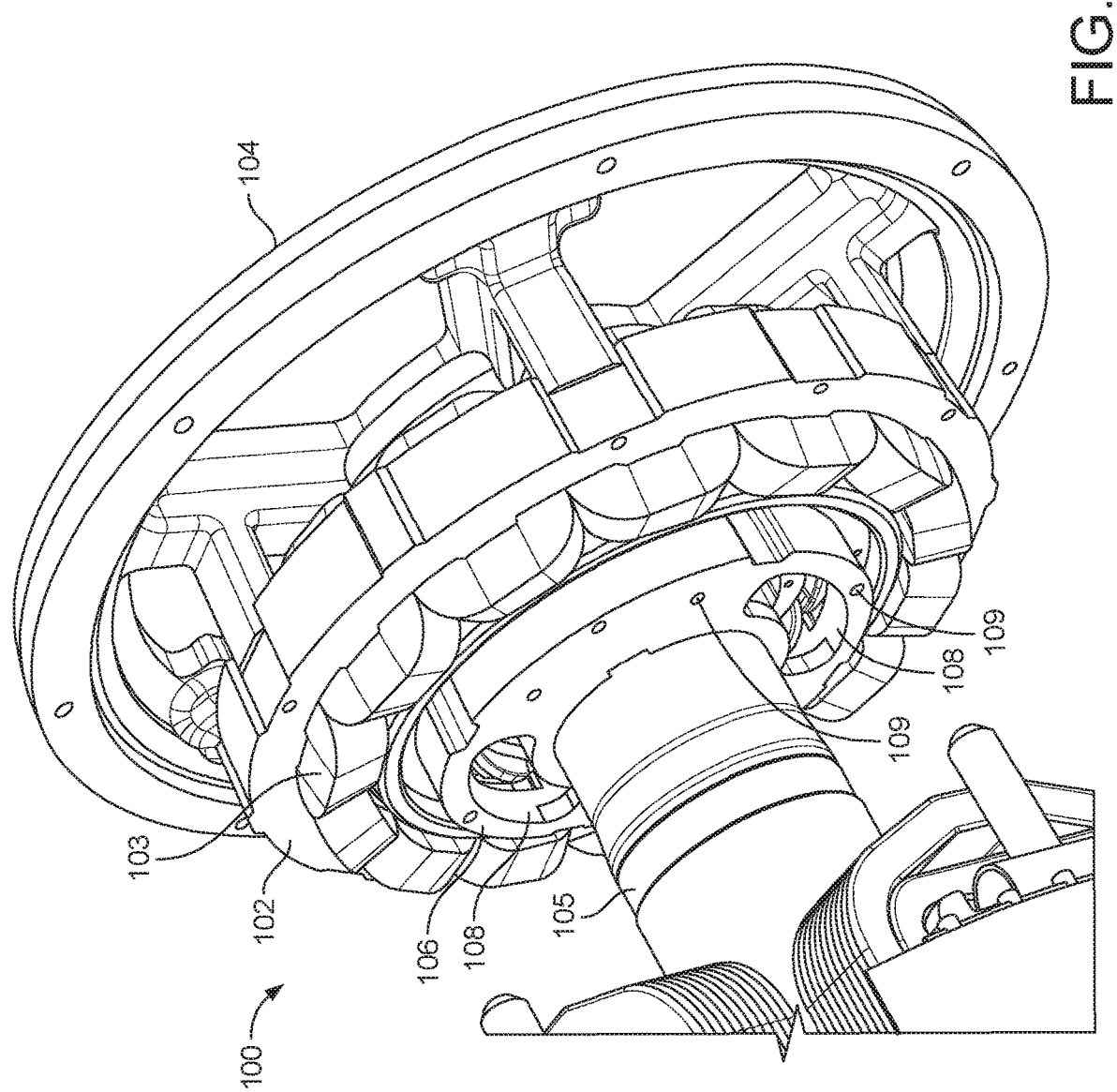
FIG. 19 shows parts of an excitation system in another embodiment of the invention.

FIG. 19 shows parts of an excitation system in another embodiment of the invention. Referring to FIG. 19, the excitation system comprises combined exciter/PMG 100 which may be in the form described above with reference to FIGS. 2 through 17. The combined exciter/PMG 100 comprises exciter stator 102 with stator windings 103. The exciter stator 102 is mounted on a bracket 104, which is may be in the form of the bracket 76 described above. The PMG stator (not visible in FIG. 19) is also mounted on the bracket 104 on the radially inwards side of the combined exciter/PMG 100. Also shown in FIG. 19 is a rotor mount 106 which is used to support the combined exciter/PMG rotor core. The combined exciter/PMG rotor core is located between exciter stator 102 and the PMG stator, as in the previous embodiments.

In this embodiment the rotor mount 106 is in the form of a rotor hub which is attached directly to the shaft 105. Ventilation holes 108 are provided through the rotor hub 106. The ventilation holes 108 allow cooling air to be drawn through the centre of the machine. Also shown in FIG. 19 are bolt holes 109 in the rotor hub. The bolt holes can be used to mount rectifier units and/or a fan and/or a balance ring, as will be explained below. Bolt holes (not visible in FIG. 19) are also provided on the other side of the rotor hub for mounting the combined exciter/PMG rotor to the rotor hub.

Figure 20:
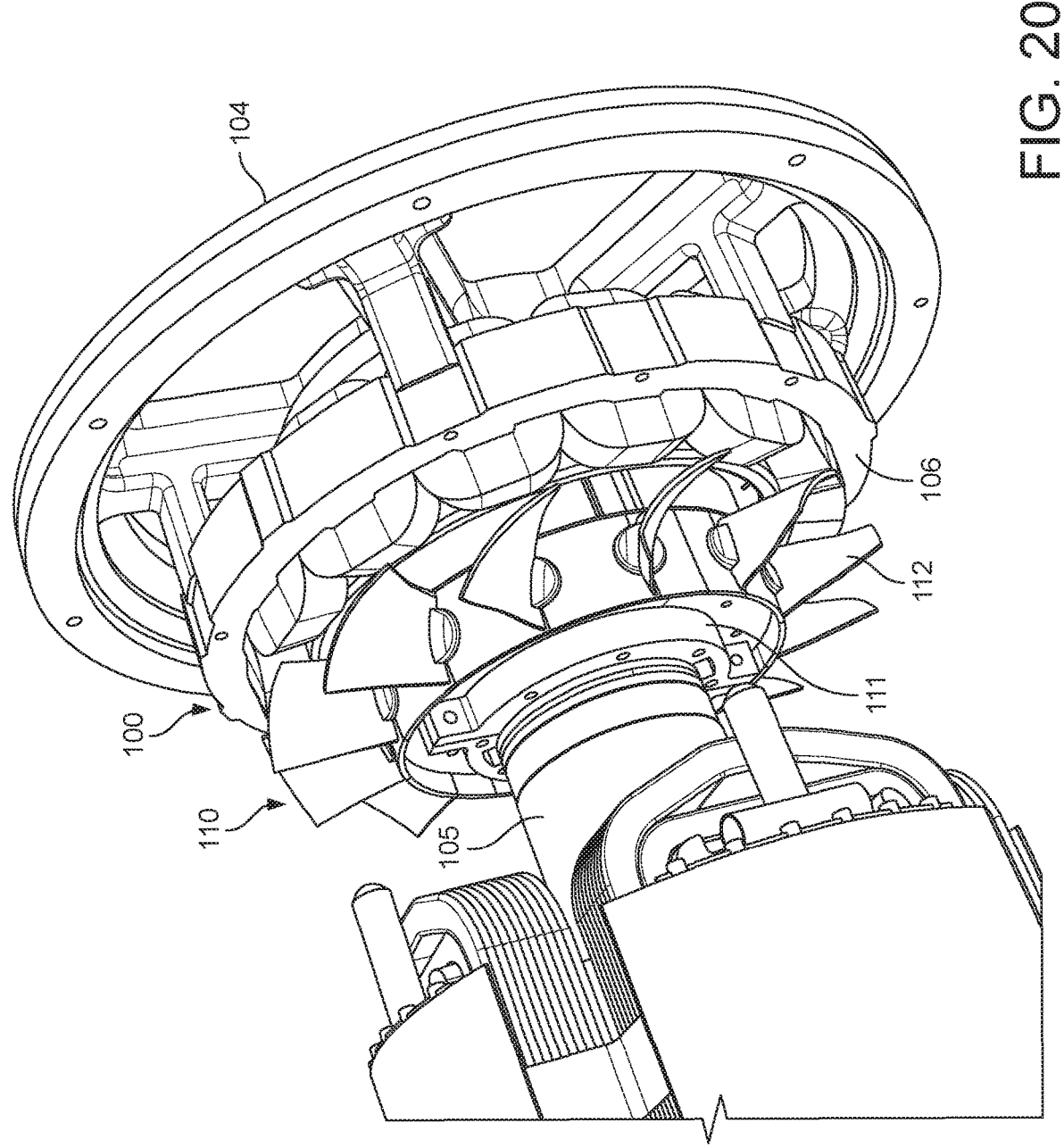
FIG. 20 shows the arrangement of FIG. 19, with the addition of a fan.

FIG. 20 shows the arrangement of FIG. 19, with the addition of a non-drive end fan 110. In this embodiment the fan 110 is mounted on the rotor hub 106, and is clamped to the shaft 105 with a clamp 111. The fan 110 comprises fan blades 112 which are angled so as to draw cooling air in an axial direction through the machine. The ventilation holes 108 in the rotor hub facilitate the flow of air through the centre of the machine. This may help to cool the centre of the machine, which may experience the highest temperatures.

Although in this embodiment the fan 110 is shown mounted on the rotor hub 106, it could alternatively be integral with the rotor hub 106 or bolted to it, in which case the clamp 111 would not be necessary.

Figure 21:
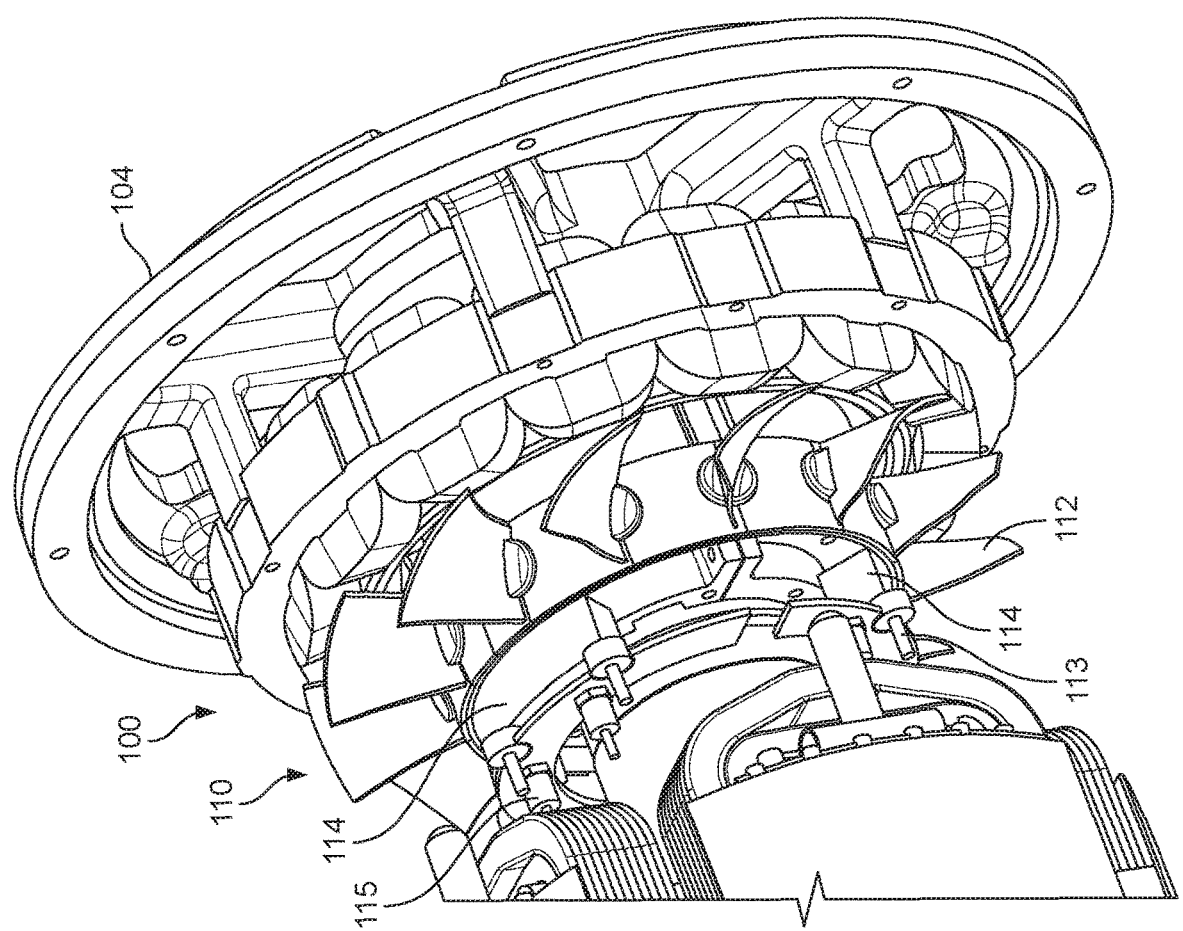
FIG. 21 shows the arrangement of FIG. 20, with the addition of rectifier units.

FIG. 21 shows the arrangement of FIG. 20, with the addition of rectifier units 114. The rectifier units 114 contain rotating diodes 115 which are used to convert the AC output of the exciter rotor windings to DC for supply to the rotor windings in the main machine. The rectifier units 114 are secured to the rotor hub 106 using bolts 113 which pass through the rectifier units and into the holes 109 in the hub. In this example two rectifier units are provided on opposite sides (radially) of the rotor hub. The rectifier units are in the form of partial rings. This can allow them to be fitted to and removed from the rotor hub while the hub is located on the shaft, which may help with assembly and servicing.

Figure 22:
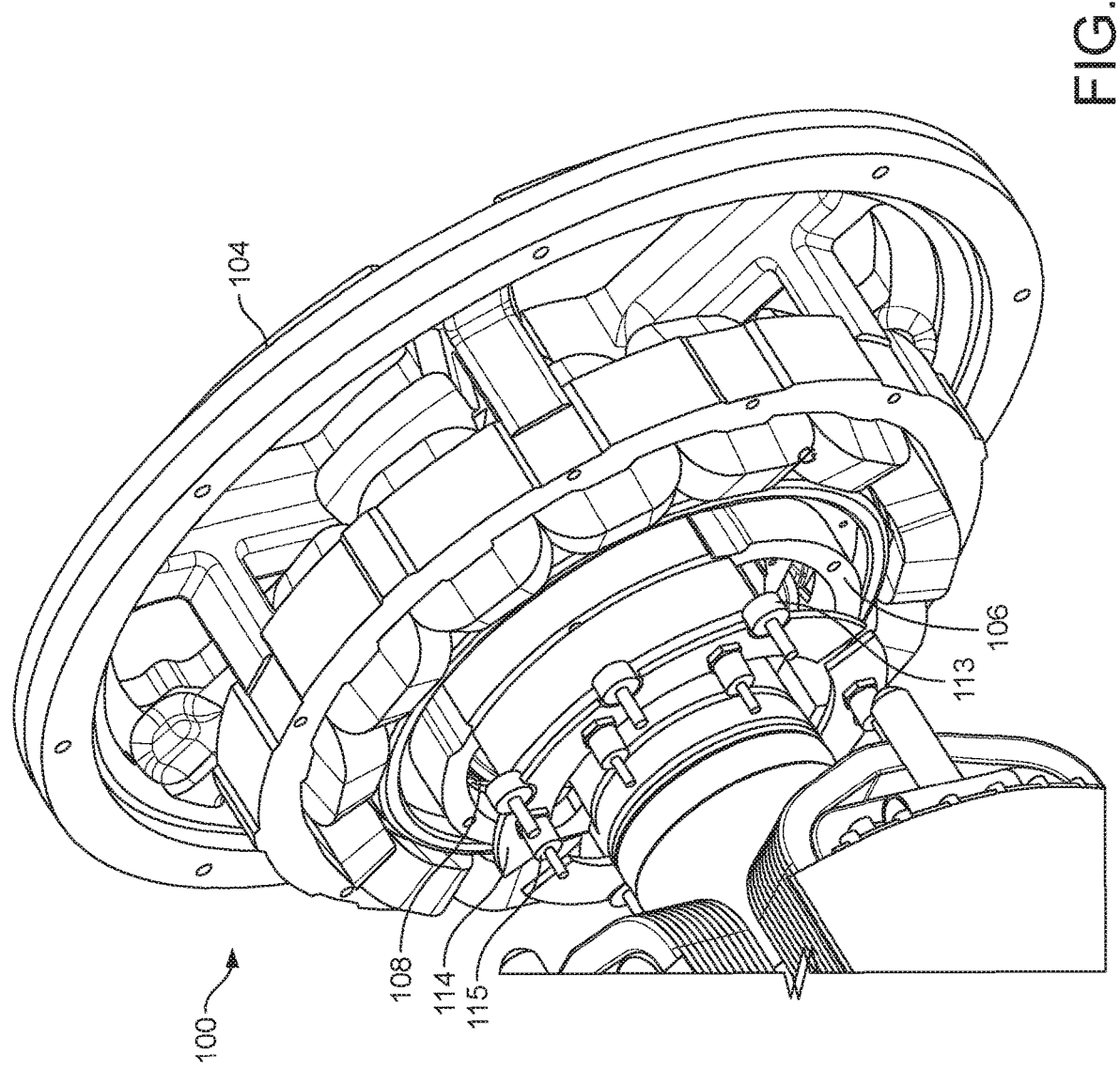
FIG. 22 shows an alternative arrangement of a combined exciter/PMG.

FIG. 22 shows an alternative arrangement of the combined exciter/PMG 100. The arrangement of FIG. 22 does not include a non-drive end fan, and cooling air is drawn through the machine using a drive end fan, or some other means. Ventilation holes 108 in the rotor hub 106 facilitate the flow of air through the centre of the machine. Rectifier units 114 are connected to the rotor hub 106 on the main machine side of the hub using bolts 113.

Figure 23:
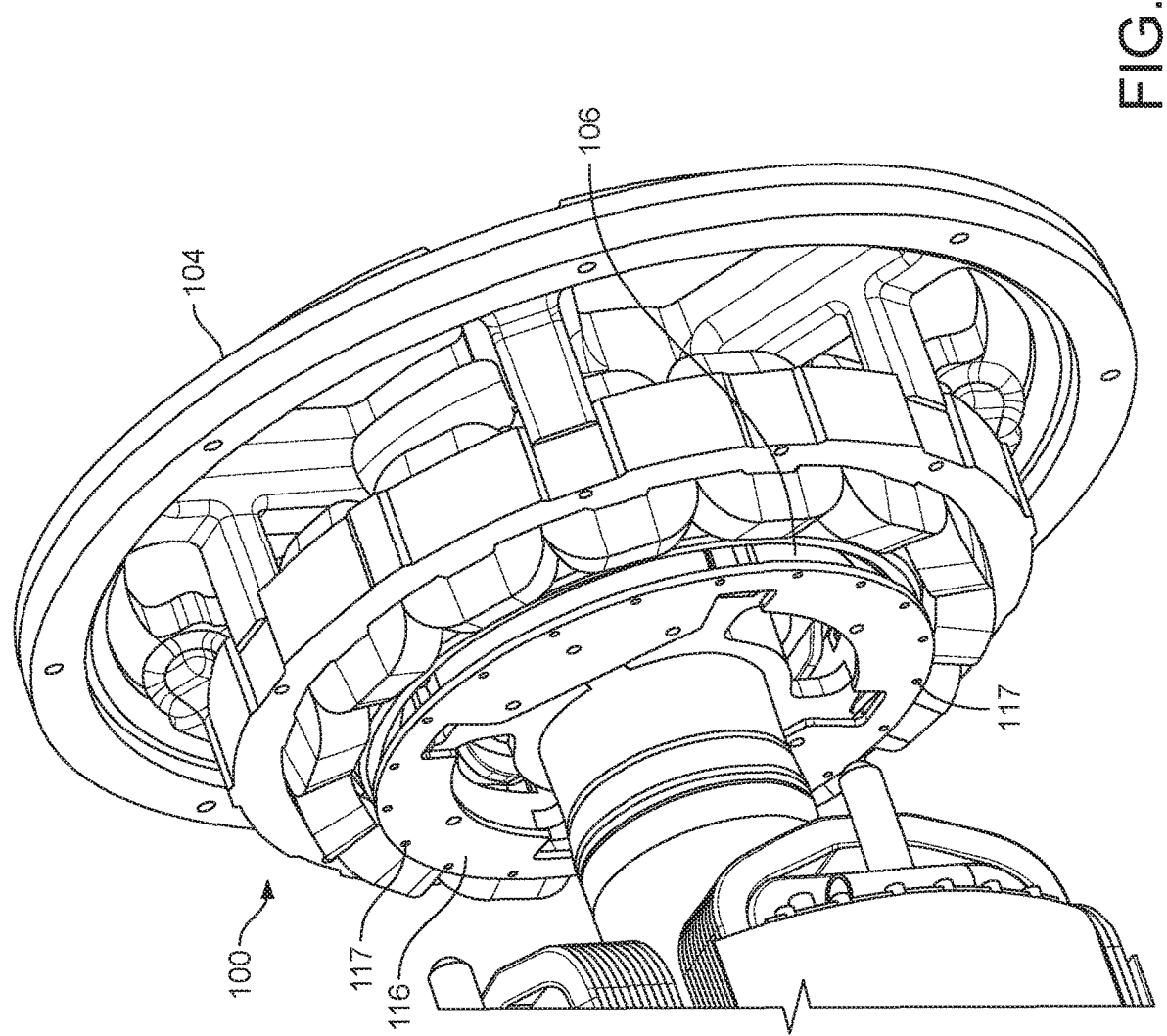
FIG. 23 shows a further arrangement of a combined exciter/PMG.

FIG. 23 shows a further arrangement of the combined exciter/PMG 100. In this arrangement, a balance ring 116 is provided which is connected to the rotor hub 106 on the main machine side of the combined exciter/PMG 100. The balance ring 116 is secured to the rotor hub 106 using bolts (not shown in FIG. 23) which pass through holes in the balance ring and into holes in the rotor hub. For example, the bolts 113 which are used to attach rectifier units may also attach the balance ring, or separate bolts may be provided.

The balance ring 116 allows the balance of the rotating components of the machine to be adjusted. This can be achieved by connecting the rotating components of the main machine and the combined exciter/PMG to a balancing machine in order to determine the correction that is required. The appropriate balancing weights can then be attached to the balance ring using bolt holes 117 around the periphery of the balance ring.

In the arrangement of FIG. 23, the balance ring 116 allows the main rotor to be balanced at the non-drive end side where access may be easier. The balancing ring 116 is sufficiently far enough back to have clearance to the end windings of the rotor. Although in this example the balance ring is separate from the rotor hub, it could alternatively be part of the rotor hub itself. Rectifier units (not shown in FIG. 23) may be connected on the main machine side of the balance ring, in a similar way to that described above with reference to FIGS. 21 and 22.

Figure 24:
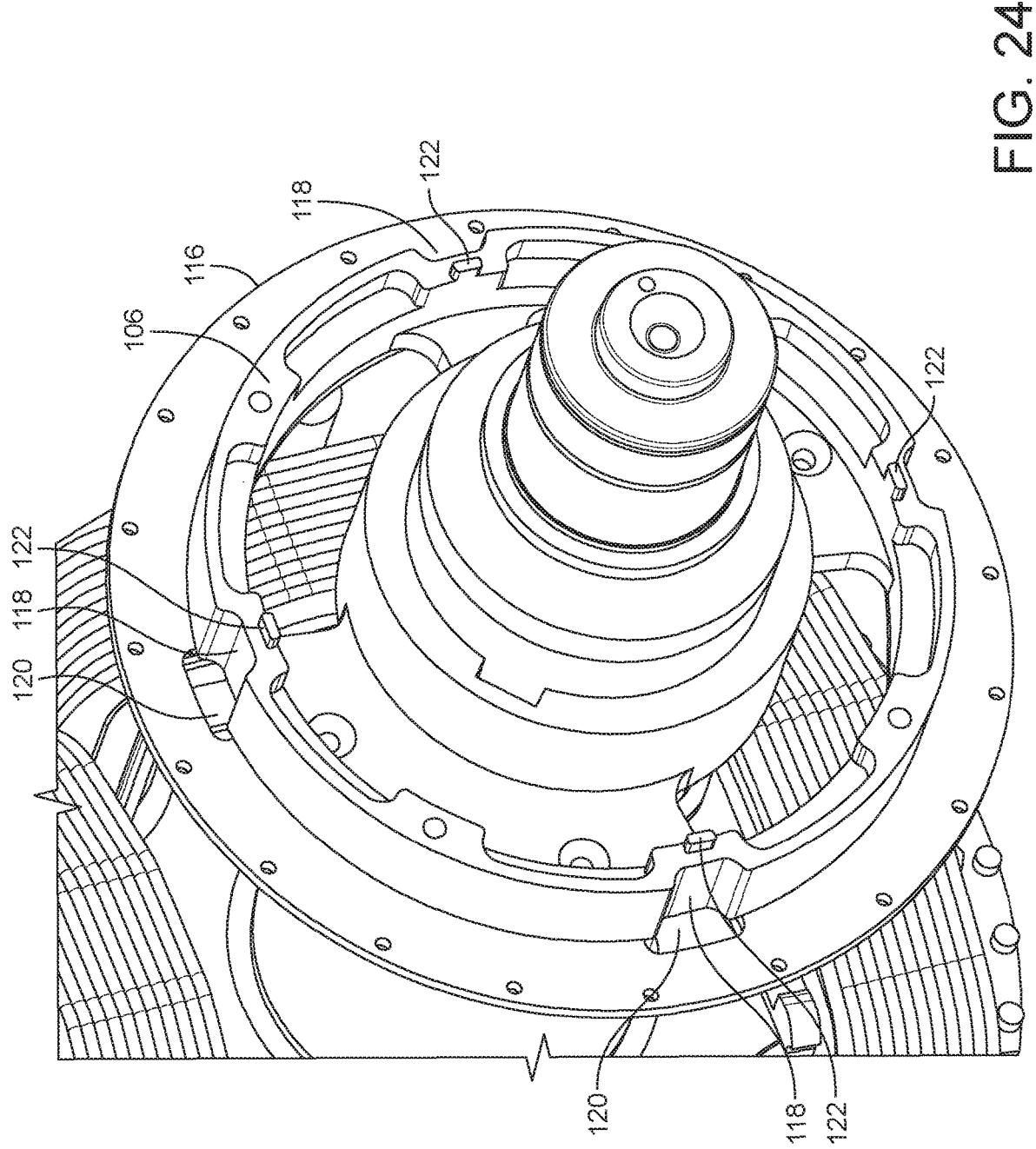
FIG. 24 is a view of a rotor hub and a balance ring.

FIG. 24 is a view of the rotor hub 106 and balance ring 116 with the other parts of the combined excitation system removed. Referring to FIG. 24, the rotor hub 106 in this embodiment comprises four channels 118 which run in an axial direction on the outside of the hub. The channels 118 are provided to allow positive and negative connections to be made from the exciter rotor windings to the rotor of the main machine. In the assembled machine, wires from the exciter rotor windings run through the channels 118 and through gaps 120 in the balance ring 116 to rectifier units on the main machine side of the balance ring. Alternatively, if rectifier units are provided on the non-drive end side of the combined exciter/PMG, then DC wires from the rectifier units may run through the channels 118 and gaps 120 to the rotor in the main machine.

Also shown in FIG. 24 are protrusions 122 on the rotor hub 106. The protrusions 122 extend out of the rotor hub in an axial direction towards the non-drive end of the machine. The protrusions 122 act as locating features for locating the combined exciter/PMG rotor.

Figure 25:
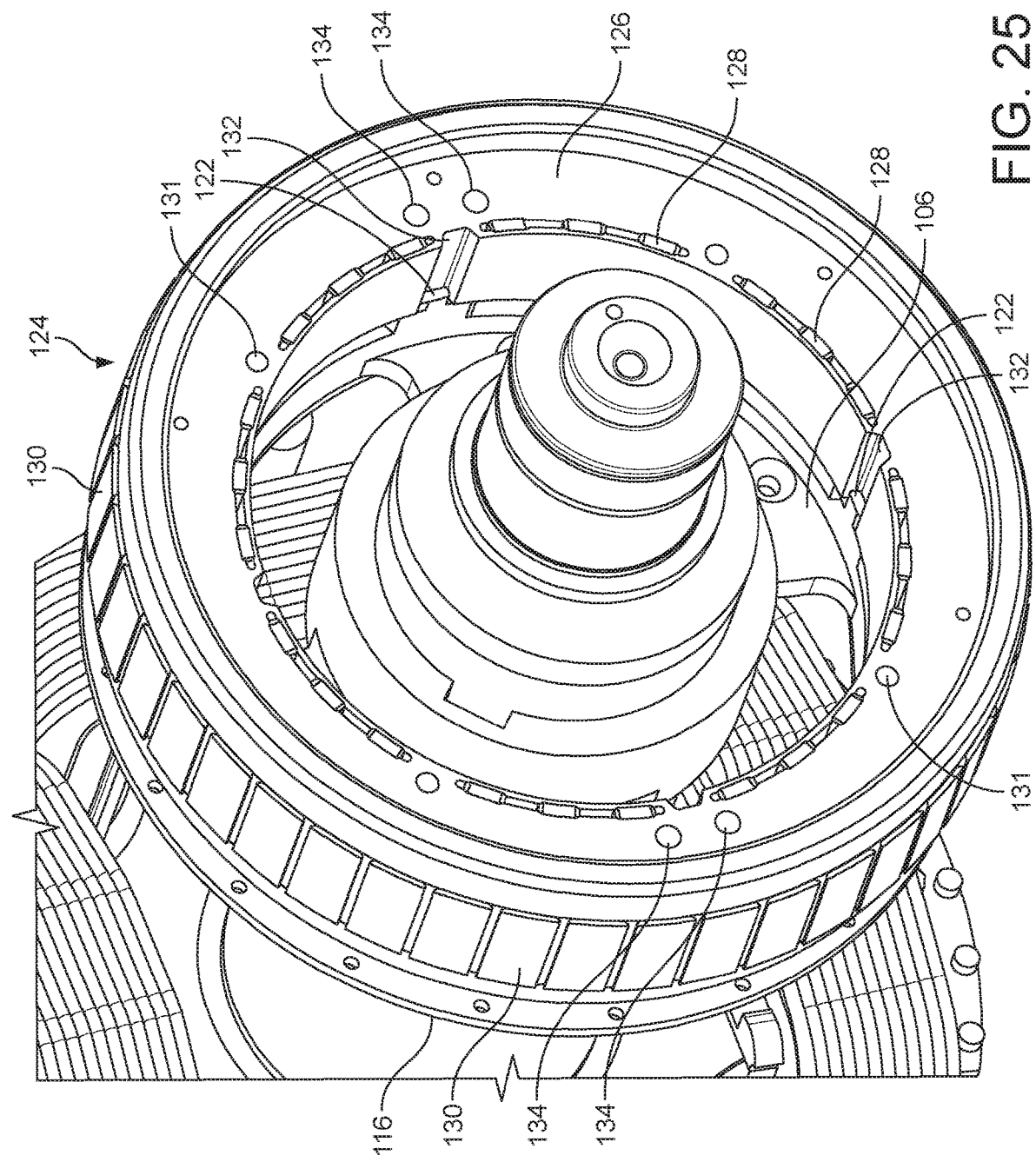
FIG. 25 shows the rotor hub and balance ring with a combined exciter/PMG rotor in place.

FIG. 25 is a view of the rotor hub 106 and balance ring 116 with the combined exciter/PMG rotor in place. Referring to FIG. 25, the combined exciter/PMG rotor 124 comprises rotor core 126 with PMG magnets 128 on its radially inwards side and exciter rotor windings 130 on its radially outwards side. The combined exciter/PMG rotor 124 is mounted on the non-drive end side of the rotor hub 106. Bolt holes 131 are provided for bolting the rotor to the rotor hub. The combined exciter/PMG rotor 124 may be in the form of the combined exciter/PMG rotor described above with reference to FIGS. 2 through 17.

In the arrangement of FIG. 25, the rotor core 126 comprises recesses 132 which run in an axial direction on the radially inwards side of the rotor core. The recesses 132 are arranged to engage with the protrusions 122 on the rotor hub 106. This helps to ensure that the combined exciter/PMG rotor 124 is locked into place so that it cannot turn or lose concentricity in use. In this embodiment the protrusions are relatively small and only protrude part-way into the rotor core 126.

In this embodiment, the rotor core 126 also comprises two pairs of holes 134 which run through the rotor core in an axial direction. The holes 134 are aligned with the channels 118 in the rotor hub and the gaps 120 in the balance ring. The two pairs of holes allow wires from the non-drive end of the exciter to run through the exciter core without any loose cables. For example, if rectifier units are located on the non-drive end side of the combined exciter/PMG, then DC wires from the rectifier units may run through the holes 134 and then the channels 118 and the gaps 120 to reach the main rotor. Alternatively, if rectifier units are located on the drive end side of the combined exciter/PMG, then AC wires may run through to the rectifier units.

Thus the two pairs of holes 134 enable a rectifier to be used on the non-drive end of the machine without any loose cables in the air gap. The holes provide clearances for positive and negative connections/signals. While in some arrangements only one pair need be used, in this embodiment two pairs of holes are provided to assist with manufacturing processes and for flexibility with rectifier placement.

Figure 26:
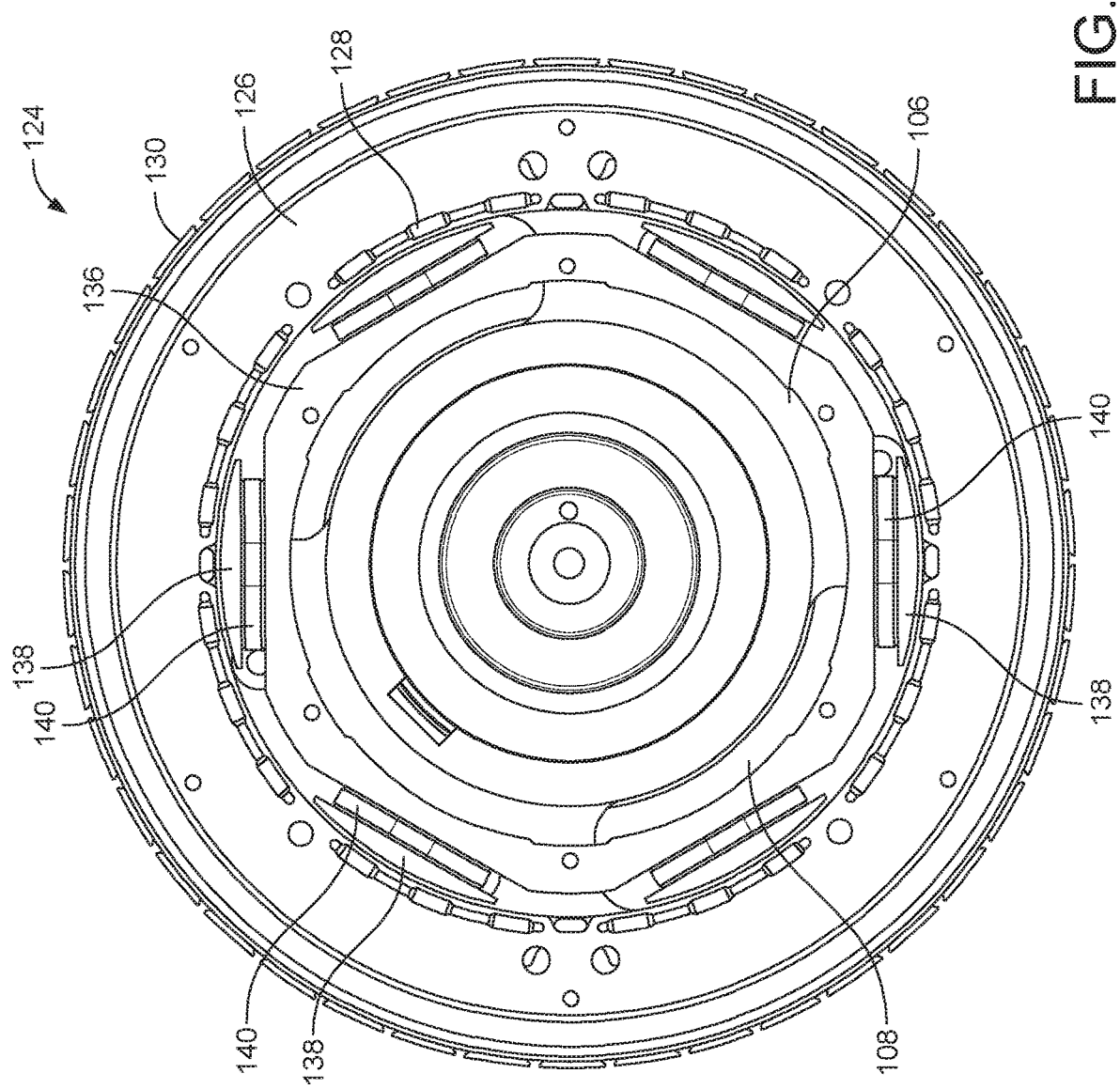
FIG. 26 shows an end view of a combined exciter/PMG rotor with a PMG stator.

FIG. 26 shows an end view of the combined exciter/PMG rotor 124 with a PMG stator. Referring to FIG. 26, the PMG stator 136 is located radially inwards of the combined exciter/PMG rotor 124.

In the arrangement shown in FIG. 26, an unconventional 12 slot PMG is used. In this arrangement, the PMG stator 136 comprises six salient poles 138. Each of the poles is wound with a coil 140. Two coils for each phase are located on opposite sides of the stator. Thus, this arrangement uses concentrated windings rather than distributed windings. This can allow full automation of the PMG winding process, thereby simplifying the manufacturing process and reducing costs.

In FIG. 26 ventilation holes 108 in the rotor hub 106 can be seen through the PMG inner diameter and between the gaps in the slotted teeth.

Overall, the combined exciter/PMG designs described above may provide some or all of the following advantages:

The entire exciter and PMG core can be punched from a single lamination rather than two or three.

A reduced number of parts is required due to a streamlined package design, leading to reduced assembly times and increased manufacturability.

The rotor design has features which enable different core lengths to use the same number of magnets without any filler material or separate lamination punches.

The design can allow air to pass through the centre of the combined machine to cool the main machine.

Less airflow blockage compared to standard excitation systems.

The design has the option to include a detachable fan on the shaft or on the rotor mount, or the rotor mount itself can form the fan.

A single lightweight rotating component is provided between two static components.

Reduced rotor weight can allow smaller bearings to be used.

The separate rotors of the known designs are combined into one which helps keep the rotor weight down and allows the installation of the PMG to be optional.

The package is designed to easily fit on different sized machines without extensive modifications.

Package is inside the main machine bearing housing rather than outside of it.

Minimised permanent magnet material consumption through design, less than that of current products.

Modular magnet arrangements to allow the same magnets to be used in different sized products.

In the above description, preferred embodiments of the invention have been described by way of example. However, it will be appreciated that the invention is not limited to these embodiments, and variations in detail will be apparent to the skilled person. For example, other types of auxiliary generator, such as a reluctance machine, could be used instead of a permanent magnet generator to provide the excitation for the exciter. In the case of a reluctance machine, rather than permanent magnets, the common rotor core may comprise a plurality of rotor poles on its inside circumference. Furthermore, parts of one embodiment may be provided with any other embodiment. While embodiments have been described with reference to a synchronous machine, the invention is applicable to any rotating electrical machine, including all types of generators and motors, for which it is desired to provide excitation.

The invention claimed is:

1. An excitation system arranged to provide excitation to a main rotating electrical machine, the excitation system comprising:
   an exciter arranged to provide excitation to the main rotating electrical machine, the exciter comprising an exciter stator core; and
   a permanent magnet generator arranged to provide excitation to the exciter, the permanent magnet generator comprising a permanent magnet generator stator core separate from the exciter stator core;
   wherein:
   one of the permanent magnet generator and the exciter is nested inside the other;
   the exciter and the permanent magnet generator share a common rotor core, the common rotor core comprising a common back iron;
   the common rotor core is substantially annular in shape;
   exciter core windings are provided on one of a radially outwards side and a radially inwards side of the common rotor core; and
   permanent magnets are provided on another of the radially outwards side and the radially inwards side of the common rotor core.

2. The excitation system according to claim 1, wherein the exciter core windings are provided on the radially outwards side of the common rotor core, and the permanent magnets are provided on the radially inwards side of the common rotor core.

3. The excitation system according to claim 2, wherein the common rotor core comprises slots on its radially outwards side for the exciter core windings.

4. The excitation system according to claim 1, wherein the exciter stator core is located radially outwards of the common rotor core and the permanent magnet generator stator core is located radially inwards of the common rotor core.

5. The excitation system according to claim 1, wherein the exciter stator core, the common rotor core and the permanent magnet generator stator core are laminated.

6. The excitation system according to claim 5, wherein a lamination for each of the exciter stator core, the common rotor core and the permanent magnet generator stator core is punched from a concentric part of a same sheet of raw material.

7. The excitation system according to claim 5, wherein a lamination for the permanent magnet generator stator core is stamped from an area of raw material which is inside an area from which the common rotor core is stamped, and a lamination for the common rotor core is stamped from an area of raw material which is inside an area from which the exciter stator core is stamped.

8. The excitation system according to claim 1, wherein at least one of the exciter stator core and the permanent magnet generator stator core is mounted on a bracket.

9. The excitation system according to claim 8, wherein the bracket is arranged to support a shaft of the main rotating electrical machine.

10. The excitation system according to claim 8, wherein the bracket comprises a first set of mounts which mount the exciter stator, and a second set of mounts which mount the permanent magnet generator stator.

11. The excitation system according to claim 10, wherein the bracket comprises a mating face which mates with a frame of the main rotating electric machine, a bearing support member which supports a bearing for the shaft of the main rotating electrical machine, and radial ribs extending between the mating face and the bearing support member.

12. The excitation system according to claim 11, wherein the first set of mounts which mount the exciter stator are co-located with the radial ribs, and ventilation holes are provided between adjacent ribs.

13. The excitation system according to claim 1, further comprising a rotor mount arranged to connect the common rotor core to a shaft of the main rotating electric machine.

14. The excitation system according to claim 13, wherein at least one of the rotor mount and the common rotor core comprises a protrusion which engages with a recess in the other of the rotor mount and the common rotor core.

15. The excitation system according to claim 1, wherein the common rotor core comprises slots arranged to accommodate the permanent magnets.

16. The excitation system according to claim 15, wherein a slot is formed on one side by a recess in the common rotor core and on the other side by webbing on the common rotor core.

17. The excitation system according to claim 16, wherein a plurality of slots is provided within a single webbing, and the plurality of slots within a single webbing accommodates magnets which form one pole of the permanent magnet generator.

18. The excitation system according to claim 1, wherein the permanent magnet generator comprises a stator core with a plurality of salient poles, and each of the plurality of salient poles is wound with a coil.

19. A rotating electrical machine comprising a main machine and an excitation system, wherein the excitation system provides excitation to the main machine, the excitation system comprising:
   an exciter arranged to provide excitation to the main machine, the exciter comprising an exciter stator core; and
   a permanent magnet generator arranged to provide excitation to the exciter and the permanent magnet generator comprising a permanent magnet generator stator core separate from the exciter stator core;
   wherein:
   one of the permanent magnet generator and the exciter is nested inside the other;
   the exciter and the permanent magnet generator share a common rotor core, the common rotor core comprising a common back iron;
   the common rotor core is substantially annular in shape;

exciter rotor windings are provided on one of a radially outwards side and a radially inwards side of the common rotor core; and permanent magnets are provided on another of the radially outwards side and the radially inwards side of the common rotor core.

20. A method of manufacturing an excitation system, the excitation system comprising an exciter for providing excitation to a main rotating electrical machine, the exciter comprising an exciter stator core, and a permanent magnet generator for providing excitation to the exciter, the permanent magnet generator comprising a permanent magnet generator stator core separate from the exciter stator core, wherein one of the permanent magnet generator and the exciter is nested inside the other, the method comprising:

manufacturing a common rotor core shared by the exciter and the permanent magnet generator, the common rotor core comprising a common back iron, wherein the common rotor core is substantially annular in shape;

providing exciter rotor windings on one of a radially outwards side and a radially inwards side of the common rotor core; and providing permanent magnets on another of the radially outwards side and the radially inwards side of the common rotor core.

* * * * *